(12) United States Patent
Haartsen

(10) Patent No.: US 11,510,197 B2
(45) Date of Patent: Nov. 22, 2022

(54) SYSTEMS AND METHODS FOR MANAGING WIRELESS PACKET COMMUNICATIONS BY ASSIGNING SEPARATE RESOURCES FOR SEQUENTIAL TRANSMISSION ATTEMPTS

(71) Applicant: Plantronics, Inc., Santa Cruz, CA (US)

(72) Inventor: Jacobus Cornelis Haartsen, Rolde (NL)

(73) Assignee: PLANTRONICS, INC., Santa Cruz, CA (US)

(\*) Notice: Subject to any disclaimer, the term of this patent is extended or adjusted under 35 U.S.C. 154(b) by 93 days.

(21) Appl. No.: 17/147,122

(22) Filed: Jan. 12, 2021

(65) Prior Publication Data

US 2021/0136758 A1 May 6, 2021

Related U.S. Application Data

(63) Continuation-in-part of application No. 16/901,251, filed on Jun. 15, 2020, and a continuation-in-part of
(Continued)

(51) Int. Cl.
*H04W 72/04* (2009.01)
*H04W 56/00* (2009.01)
(Continued)

(52) U.S. Cl.
CPC ........ *H04W 72/0446* (2013.01); *H04W 4/80* (2018.02); *H04W 56/0005* (2013.01); *H04W 72/082* (2013.01)

(58) Field of Classification Search
CPC . H04W 72/0446; H04W 4/80; H04W 72/082; H04W 56/0005
See application file for complete search history.

(56) References Cited

U.S. PATENT DOCUMENTS

| | | | |
|---|---|---|---|
| 9,699,741 B1 | 7/2017 | Chu | ............ H04W 52/24 |
| 2004/0224650 A1 | 11/2004 | Hundal | ............ 455/114.2 |

(Continued)

FOREIGN PATENT DOCUMENTS

| | | | | |
|---|---|---|---|---|
| DE | 202010009381 U1 | \* 12/2010 | ........ | H04M 1/72527 |
| EP | 1 133 094 | 9/2001 | ........ | H04L 1/00 |

(Continued)

OTHER PUBLICATIONS

Search Report & Written Opinion for International Application No. PCT/US2020/016940, 24 pages, dated May 25, 2020.

(Continued)

*Primary Examiner* — Yuwen Pan
*Assistant Examiner* — Angelica M Perez
(74) *Attorney, Agent, or Firm* — Slayden Grubert Beard PLLC

(57) ABSTRACT

Systems and methods are provided for managing multiple wireless links, e.g., between base stations and wireless headsets. Each wireless link communicates data packets (e.g., audio data packets) according to a wireless protocol (e.g., Bluetooth) defining a series of connection intervals having a defined number of frames (e.g., Bluetooth eSCO intervals including 6 or 12 frames per interval). A controller stores interval segmentation data specifying a first interval segment (including a first subset of frames) allocated to original transmissions of packets and at least one additional interval segment (including additional subsets of frames) allocated to retransmissions of failed packets. The controller uses the interval segmentation data to manage timing for packet transmissions and retransmissions by the various wireless devices, such that each device (a) sends transmissions only during the first interval segment and (b) sends retransmissions only during the additional interval segment (Continued)

(s), to thereby reduce interference between the various wireless links.

34 Claims, 16 Drawing Sheets

Related U.S. Application Data application No. PCT/US2020/025816, filed on Mar. 30, 2020, and a continuation-in-part of application No. 16/270,514, filed on Feb. 7, 2019, now Pat. No. 10,917,799.

(51) Int. Cl.
*H04W 72/08* (2009.01)
*H04W 4/80* (2018.01)

(56) References Cited

U.S. PATENT DOCUMENTS

| | | | | |
|---|---|---|---|---|
| 2006/0092871 A1* | 5/2006 | Nishibayashi | ........ | H04L 1/1671 370/477 |
| 2009/0154388 A1 | 6/2009 | Jalloul | ........... | 370/312 |
| 2010/0022263 A1 | 1/2010 | Stamoulis | ..................... | 455/501 |
| 2011/0110340 A1 | 5/2011 | Lakkis | ......................... | 370/336 |
| 2014/0094183 A1 | 4/2014 | Gao | ....................... | H04W 72/04 |
| 2015/0111610 A1* | 4/2015 | Hwang | .............. | H04W 72/1215 455/553.1 |
| 2016/0072949 A1 | 3/2016 | Kannappan | ............. | H04M 3/51 |
| 2016/0323922 A1 | 11/2016 | Park | .................... | H04W 76/023 |
| 2017/0134138 A1* | 5/2017 | Madhavan | .......... | H04L 27/2603 |
| 2017/0142535 A1 | 5/2017 | Aggarwal | ................. | H04S 7/00 |
| 2017/0245166 A1 | 8/2017 | Bienas | ................. | H04W 24/08 |
| 2019/0150001 A1 | 5/2019 | Jen | ......................... | H04W 16/18 |
| 2019/0174557 A1 | 6/2019 | Ueda | ..................... | H04W 76/02 |
| 2019/0342068 A1 | 11/2019 | Haartsen | .................... | H04L 7/10 |
| 2020/0021328 A1 | 1/2020 | Haartsen | .............. | H04B 1/7143 |

FOREIGN PATENT DOCUMENTS

| | | | | |
|---|---|---|---|---|
| EP | 3 041 305 | 7/2016 | ............ | H04W 72/04 |
| WO | 2020 092944 | 5/2020 | .............. | H04M 1/60 |

OTHER PUBLICATIONS

Search Report & Written Opinion for International Application No. PCT/US2020/025816, 11 pages, dated Jun. 17, 2020.
Search Report for EP Application No. 22151250.2, 9 pages, dated Jun. 7, 2022.

* cited by examiner

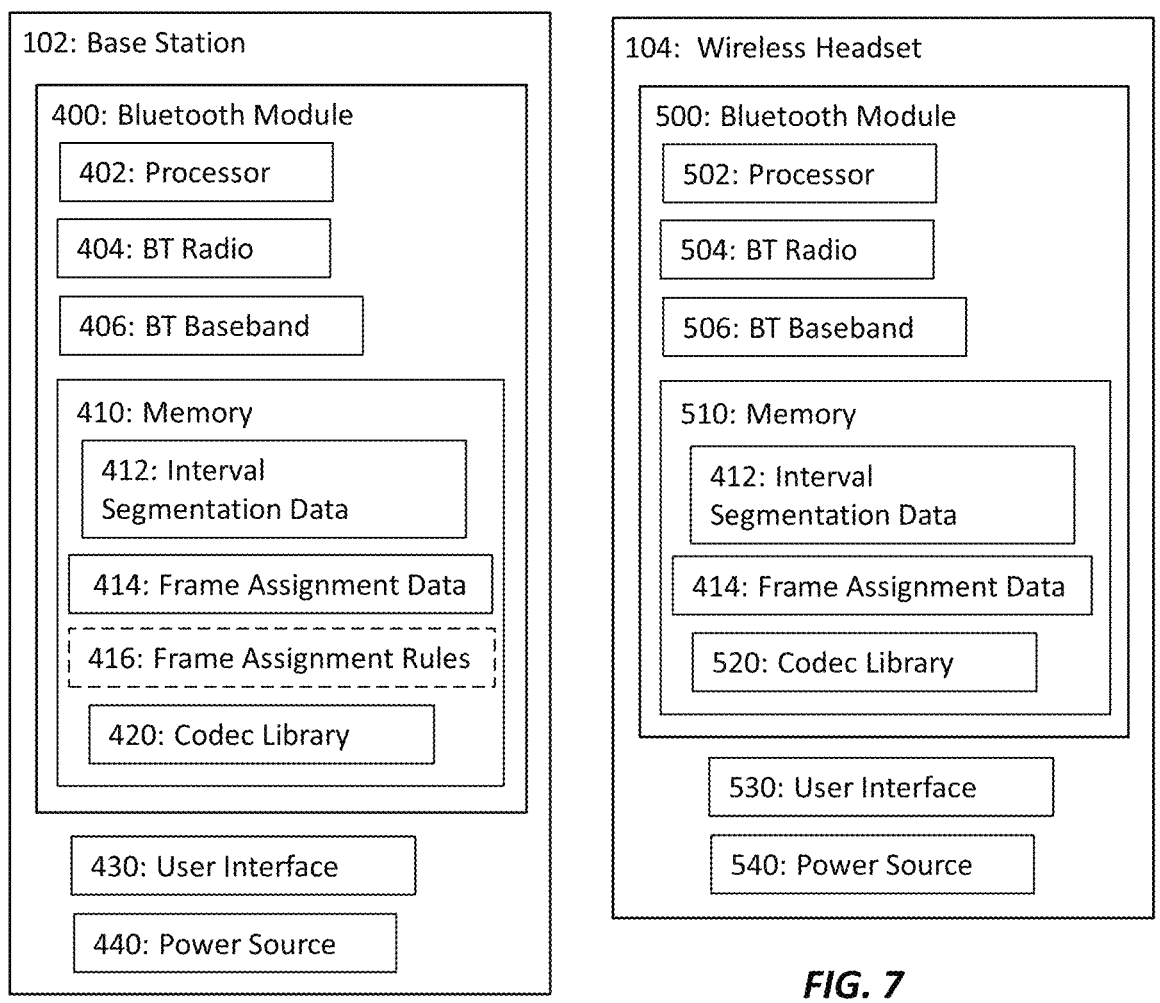

1600

| $N_{ret}$ | Interval segment sizes (number of frames in each segment) | Gain |
|---|---|---|
| 1 | (7, 5) | 1.4 |
| 2 | (6, 4, 2) | 2.0 |
| 3 | (5, 3, 2, 2) | 2.5 |

*FIG. 16*

SYSTEMS AND METHODS FOR MANAGING WIRELESS PACKET COMMUNICATIONS BY ASSIGNING SEPARATE RESOURCES FOR SEQUENTIAL TRANSMISSION ATTEMPTS

RELATED APPLICATION

This application is a continuation-in-part (CIP) of (a) U.S. patent application Ser. No. 16/901,251 filed Jun. 15, 2020, (b) International Application No. PCT/US2020/025816 filed Mar. 30, 2020, and (c) U.S. patent application Ser. No. 16/270,514 filed Feb. 7, 2019, the entire contents of which applications are hereby incorporated by reference for all purposes.

TECHNICAL FIELD

The present invention relates to the field of wireless communications, and more particularly, to systems and methods for segmenting and allocating communication resources for transmission and retransmissions of data packets, e.g., to improve wireless audio communications.

BACKGROUND

Enterprise wireless communications environments, e.g., call centers, often use Bluetooth Classic, Bluetooth derivatives such as Bluetooth Low Energy (BLE), Digital European Cordless Telecommunications (DECT), and other packet-based radio systems for wireless communications. In such environments, user density and effective wireless range for wireless communications (e.g., voice, streaming music, etc.) are important factors defining the capability or quality of the respective environment.

User density relates to the number of active users in a restricted area that experience an acceptable service level, e.g., according to defined performance standards. User density typically depends on several parameters such as the traffic load per link, the number carriers to hop over, the link capacity needed per user, and the robustness of the link protocol. The effective range of a wireless communications system typically depends on noise conditions in the receiver and the implemented modulation scheme. For example, wide-band, high-rate modulation schemes are typically more susceptible to noise and result in a lower range.

In a Bluetooth system, voice is compressed and sent in a series of short packets to the receiver, according to a frequency-hopping and time-slotted protocol. A packet may be interfered by packets from other Bluetooth transmitters, or by signals from other transmitters in the 2.4 GHz ISM band used by Bluetooth. A major source of interference in which band is WiFi technology based on the IEEE 802.11 standard. A packet reception may be interfered by another packet when there is a collision in time and in frequency. Whether a packet is lost (e.g., received erroneously at the intended recipient) depends on (1) the strength of the interference power with respect to the strength of the intended received power, (2) whether the packets (partly) overlap in time, and (3) whether the packets make use of the same (or near-adjacent) carrier frequency. An erroneously received packet (e.g., where at least one bit in the received bit pattern is erroneous) is referred to herein as a "failed packet," whereas a received packet containing the true content is referred to herein a "successful packet." The "true content" of a packet refers to the content (i.e., bit pattern) of the packet transmitted by the transmitting device for receipt by the recipient.

The quality of a Bluetooth connection (or other packet-based radio connection) may be defined by an error rate experienced at the wireless receiver, referred to herein as the Data Error Rate (DER), which may define, for example, a Bit Error Rate (BER), a Packet Error Rate (PER), or a Frame Error Rate (FER) experienced at the Bluetooth receiver. Voice over Bluetooth is quite robust and an acceptable quality (expressed in Mean Opinion Score, or MOS) is achieved at an FER of 1% and below.

As noted above, Bluetooth uses a frequency-hopping and time-slotted protocol. Mutual interference occurs when different users overlap both in frequency and time. Several methods have been investigated to improve user density in Bluetooth environments, for example by reducing the transmitted interference or by improving the robustness of the receiver, e.g., to reduce the impact of packet collisions, and thus failed packets, at the receiver. Reduced interference can be achieved by lowering the duty cycle of the transmission, for example by using lower-rate audio codecs like the 32 kb/s CELT codec, increasing the voice packet interval, or "connection interval" $T_{eSCO}$ from 7.5 ms to 15 ms, or applying Discontinuous Transmission (DTX). The robustness of the receiver can be increases by increasing the maximum number of retransmission opportunities (as discussed below), or by applying error concealment techniques that permit higher frame erasure rates (FER). Some improvement measures require hardware changes (typically carried out by the chip manufacturers), others can be implemented with software changes only.

One particular technique for reducing transmission errors and thus increasing user density involves automatically retransmitting failed packets. For example, some existing Bluetooth systems are configured to perform one or more "fast retransmission" of each failed packet to reduce transmission errors. In a fast packet retransmission (ARQ) scheme, each received packet is checked for errors (using the Cyclic Redundancy Check CRC that is appended to each packet), and if errors are detected in the received packet, a request for retransmission is returned, leading to a retransmission of the same packet directly in the next available slot. The retransmitted packet is checked for errors and if the CRC check fails again, a new retransmission requested, and so on. However, these packet retransmissions may again result in collisions, even with retransmissions on links that gave rise to the earlier errors caused by repeated interference.

FIG. 1 illustrates a timing diagram of a mono voice link (eSCO) between a wireless headset and base station for a single user, according to a standard Bluetooth protocol that implements fast packet retransmission (ARQ) for failed packets. Each device (wireless headset and base station) includes is configured to transmit data to and receive data from the other device. One device (e.g., the base station) may act as the master device ("master"), with the other (e.g., the headset) acting as a slave device ("slave"). Each device (e.g., master and slave) analyzes each packet received from the other device using a Cyclic Redundancy Check ("CRC check") to determine whether the received packet contains the true content (i.e., a successful packet) or contains erroneous data (i.e., a failed packet). If the CRC check passes, the receiver notifies the transmitter of the passed CRC check, and the transmitter does not retransmit the packet. However, if the CRC check fails, the receiver notifies the transmitter of the failed CRC check; if the transmitter does not receive a notification of the CRC check within a certain time period, this may automatically be interpreted as a failed CRC. A failed CRC check prompts the transmitter to retransmit the failed packet until either (a) the receiver notifies the transmitter of a passed CRC check after a particular retransmission of the packet (indicating a successful packet) or (b) the transmitter reaches a predefined maximum number of retransmissions.

Thus, with reference to the mono voice link shown in FIG. 1, the master performs an initial transmission of a first voice packet to the slave, followed by the slave performing an initial transmission of a second voice packet to the master, along with a result of a CRC check performed by the slave indicating whether the first voice packet from the master was received at the slave as a successful packet or as a failed packet. If the CRC check result indicates a failed CRC check, the master initiates a first retransmission of the first voice packet, along with a result of a CRC check performed by the master indicating whether the second voice packet from the slave was a successful packet or a failed packet. Retransmissions by the master and/or slave may continue until the master and slave each receive a confirmation of a successful packet reception from the other device, or until a maximum number of retransmissions is reached.

FIG. 1 also indicates the carrier frequency fx of each respective transmission. As indicated, each retransmission may be performed on a different carrier frequency. This pattern is repeated during each connection interval $T_{eSCO}$, each time using different carrier frequencies. The connection interval $T_{eSCO}$ may be 7.5 ms or 15 ms, e.g., depending on the implemented codes.

In the Bluetooth standard, the maximum number of retransmissions in each connection interval by each device (master and slave) can be negotiated for each link via a link manager (LM) protocol during a link setup. In many systems or configurations, the maximum number of retransmissions is set at two, such that any particular packet can be sent up to three times (original transmission plus up to two retransmissions). In systems or other configurations, the maximum retransmission number is increased to three, which has been found to increase the allowable user density by about a factor of 1.4×.

FIG. 2 shows an example timing diagram of a mono voice link (eSCO) according to the Bluetooth protocol shown in FIG. 1, for three users A, B, and C in physical proximity to each other, e.g., three headset users in a call center. The voice link for each user comprises a Bluetooth link between a base station (indicated at TX) and headset (indicated at RX). As discussed above, for each mono voice link, a voice packet is first sent from master (base station) to slave (headset), followed by a voice packet sent from slave (headset) to master (base station). Both packets are sent on the same carrier frequency fx. After the first transmission (indicated by dark shaded boxes in FIG. 2), there are two retransmit opportunities (indicated by lightly shaded boxes in FIG. 2), which may be sent on different carrier frequencies, e.g., according to a pseudo-random frequency-hopping scheme. This pattern is repeated during each connection interval TeSCO, each time on different carrier frequencies. As discussed above regarding FIG. 1, each packet received by each respective device is checked for errors using a CRC code, and retransmission(s) are requested until the packet is successfully received or the maximum number of retransmissions (e.g., 2 or 3) has been reached.

In conventional systems, the connections of the different users A, B, and C are not synchronized in time, and thus transmissions and retransmissions of the different users may overlap in time, potentially interfering with each other. For example, as shown in FIG. 2, the transmissions of user B (partly) overlap with the transmissions of user A. Both the first transmissions (dark shaded boxes), and also the possible retransmissions (light shaded boxes) of users A and B overlap in time. Thus, after a transmission of user A collides with a transmission of user B, the retransmission(s) of user A may collide with retransmission(s) of user B (at least in instances of frequency overlap between users A and B). Further, the first transmission of user C may interfere with retransmissions of users A and B, and retransmissions of user C may interfere with further retransmission of users A and B. The collisions between packets of users A, B, and C trigger even more retransmissions, further increasing the overall traffic load.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

The above object and other objects are solved by the invention as defined in the independent claims. The dependent claims and the following specification discuss various embodiments.

Embodiments of the present invention provide systems and methods for managing multiple wireless communication links between wireless devices (e.g., wireless links between wireless headsets and associated base stations) in a wireless communication environment that employs packet retransmissions for failed packet transmissions. The wireless links communicate data packets using a defined set or "pool" of wireless communication resources, e.g., a defined set of time slots (e.g., frames) for communicating packets, a defined set of communication frequencies, a defined set of codes for signal communications (e.g., in a CDMA system), or combinations of the above. In some embodiments, a controller generates or has access to resource segmentation data assigning different segments (subsets) of the communication resource pool to different stages of attempted packet transmissions: original packet transmissions, first retransmissions of failed packets, second retransmissions of failed packets, etc. For example, the resource segmentation data may define a first segment (subset) of the resource pool to original packet transmissions, a second segment (subset) of the resource pool resources to first retransmissions of failed packets, a third segment (subset) of the resource pool to second retransmissions of failed packets etc.

The controller manages the wireless communication links between the wireless devices according to the resource segmentation data (e.g., by communicating the resource segmentation data to the wireless devices), such that each wireless device (a) sends original packet transmissions using only the first segment of communication resources, (b) sends first retransmissions of failed packets using only the second segment of communication resources, sends second retransmissions of failed packets using only the third segment of communication resources, etc.

In other embodiments, the resource segmentation data may be programmed or otherwise stored in each wireless device (e.g., during manufacturing or at a later time), as opposed to such data being generated and managed by a central controller. However, in some such embodiments, a central controller may still be used for synchronizing the various wireless devices, e.g., by broadcasting periodic timing signals that can be used by the wireless devices to synchronize their respective clocks to thereby coordinate their respective transmissions.

By segmenting and allocating the available communication resource pool between packet transmissions and retransmissions, original packet transmissions are competing for resources only with other original packet transmissions, first retransmissions (of failed original transmissions) are competing for resources only with other first retransmissions, second retransmissions (of failed original first transmissions) are competing for resources only with other second retransmissions, etc. The inventor has discovered that such separation (segmentation) and allocation of the available wireless communication resources used for first transmissions, second transmissions, third transmissions, etc., can significantly reduce the interference between transmissions/retransmissions by multiple devices (e.g., headsets and base stations) in a shared environment, thus substantial improving the effective user density within the environment. Separating the available communication resource pool can be done in multiple ways, for example in the frequency domain, in the time domain or in the code domain, or with combinations of multiple domains.

Accordingly, in some embodiments, the relevant communication resource pool comprises a set of available frequency channels or carriers. For example, in a Bluetooth environment that utilizes a frequency band including a defined number of frequency channels, or carriers (e.g., a set of carriers spaced at 1 MHz within a larger frequency band), the resource segmentation data may comprise frequency segmentation data allocating different segments (subsets) of the available frequency channels to different stages of packet transmissions: original packet transmissions, first retransmissions of failed packets, second retransmissions of failed packets, etc. For example, the frequency segmentation data may allocate a first segment (subset) of frequency channels to original packet transmissions, a second segment (subset) of frequency channels to first packet retransmissions, a third segment (subset) of frequency channels to second packet retransmissions etc. This segmentation of transmission stages into different frequency channels may reduce interference between transmissions/retransmissions by the various headsets and base stations in the environment, thus increasing the allowable user density in the relevant environment.

In other embodiments, the relevant communication resource pool comprises a set of available time slots, or frames, for transmitting packets. For example, a Bluetooth protocol defines a series of connection intervals, each having a defined number of time slots, or frames, for transmitting data packets. Each connection interval (eSCO interval) may for example include 6 or 12 frames, depending on the particular implementation. In some embodiments, a shared controller may store interval segmentation data specifying, for each connection interval, a first interval segment allocating a first segment (subset) of frames in the connection interval to original packet transmissions, a second interval segment allocating a second segment (subset) of frames in the connection interval to first retransmissions of failed packets, a third interval segment allocating a third segment (subset) of frames in the connection interval to second retransmissions of failed packets, etc. The controller uses this interval segmentation data to manage the timing of packet transmissions and retransmissions by the various headsets and base stations, using the interval segments allocated to each respective stage of packet transmissions (original transmissions, first retransmissions, second retransmissions, etc.). This segmentation of transmission stages into different interval segments may reduce interference between transmissions/retransmissions by the various headsets and base stations in the environment, thus increasing the allowable user density in the relevant environment.

In other embodiments, the interval segmentation data may be programmed or otherwise stored in each wireless device (e.g., during manufacturing or at a later time), as opposed to such data being generated and managed by a central controller.

One aspect of the invention provides a method for managing communications in a wireless environment including a plurality of wireless links communicating data between a plurality of wireless communication devices according to a wireless communications protocol using a defined set of wireless communication resources. The wireless communication devices are configured to access (e.g., from internal memory or from a shared controller) wireless communication resource segmentation data that specifies multiple resource segments, including (a) a first resource segment, comprising a first subset of the defined set of wireless communication resources, allocated to transmissions of packets and (b) at least one additional resource segment, each comprising an additional subset of the defined set of wireless communication resources, allocated to retransmissions of failed packets. The wireless communication devices are configured to use the wireless communication resource segmentation data to manage wireless transmissions and retransmissions of packets by wireless communication device, such that: (a) each wireless communication device performs packet transmissions using the first resource segment, but not the at least one additional resource segment, and (b) each wireless communication device performs packet retransmissions using the at least one additional resource segment but not the first resource segment.

In some embodiments, the first resource segment is larger than each of the at least one additional resource segment.

In some embodiments, the set of wireless communication resources comprises a defined set of time-slots for wireless communications (e.g., the series of frames in each eSCO interval in a Bluetooth transmission protocol). In other embodiments, the set of wireless communication resources comprises a defined group of frequencies for wireless communications. In still other embodiments, the wireless communications protocol comprises a spread-spectrum protocol, and the set of wireless communication resources comprises a set of codes defined by the spread-spectrum protocol.

In some embodiments, the method further includes, for each respective wireless link in the plurality of wireless links: (a) determining or accessing, by respective wireless communication devices associated with the respective wireless link, frame assignment data for the respective wireless link specifying a particular frame in each of the multiple interval segments assigned for communications via the respective wireless link; and (b) transmitting and retransmitting packets, by the respective wireless communication devices, only in the particular frames specified by the frame assignment data for the respective wireless link.

Another aspect of the invention provides a method for managing communications in a wireless environment including a plurality of wireless links communicating data between a plurality of wireless communication devices according to a wireless communications protocol defining a series of connection intervals, each having a defined number of frames for communicating packets. The method includes storing interval segmentation data specifying multiple interval segments for each connection interval, each interval segment including a subset of the series of frames, including a first interval segment allocated to transmissions of packets and at least one additional interval segment allocated to retransmissions of failed packets. The interval segmentation data is used to manage timing for packet transmissions and packet retransmissions by the plurality of wireless communication devices via the plurality of wireless links, such that (a) each wireless communication device performs packet transmissions only during the first interval segment in respective connection intervals; and (b) each wireless communication device performs packet retransmissions only during the at least one additional interval segment in respective connection intervals.

In some embodiments, the packet transmissions and retransmissions comprise transmissions and retransmissions of audio packets.

In some embodiments, the step of using the interval segmentation data to manage a timing of packet transmissions and packet retransmissions by the plurality of wireless communication devices is performed by a controller configured to communicate with the plurality of wireless communication devices.

In some embodiments, the method further includes, for each respective wireless link of the plurality of wireless links: (a) determining, by the shared controller, frame assignment data for the respective wireless link specifying a particular frame in each of the multiple interval segments assigned for communications by respective wireless communication devices associated with the respective wireless link; and (b) communicating the determined frame assignment data from the shared controller to at least one of the respective wireless communication device associated with the respective wireless link such that the respective wireless communication devices perform packet transmissions and retransmissions only during the particular frames specified by the frame assignment data for the respective wireless link.

In some embodiments, determining, by the shared controller, frame assignment data for the respective wireless link comprises determining frame assignment data for the respective wireless link according to frame assignment rules configured to reduce or minimize interference with other wireless links.

In some embodiments, the frame assignment data for the respective wireless link specifies the particular frame for at least one interval segment changing during the series of connection intervals.

In some embodiments, the wireless communications protocol defining a series of connection intervals comprises a Bluetooth protocol defining a series of eSCO intervals.

In some embodiments, the first interval segment allocated to transmissions of packets includes a larger subset of frames than each of the at least one additional interval segment allocated to retransmissions of failed packets.

In some embodiments, the interval segmentation data specifies the first interval segment allocated to transmissions of packets, a second interval segment allocated to first retransmissions of failed packets, and a third interval segment allocated to second retransmissions of failed packets. In some embodiments, the first interval segment is larger than the second interval segment, and the second interval segment is larger than the third interval segment.

In some embodiments, the interval segmentation data specifies the first interval segment allocated to transmissions of packets, a second interval segment allocated to first retransmissions of failed packets, a third interval segment allocated to second retransmissions of failed packets, and a fourth interval segment allocated to third retransmissions of failed packets. In some embodiments, the first interval segment is larger than the second interval segment, the second interval segment is (a) equal to or larger than the third interval segment, and (b) larger than the fourth interval segment.

In some embodiments, each of the plurality of wireless links communicates data according to a respective connection interval timing, and the method further includes using a shared controller to synchronize the connection interval timing for the plurality of wireless links.

In some embodiments, each of the plurality of wireless links communicates data according to a respective connection interval timing, and the step of managing the timing for packet transmissions and retransmissions comprises communicating, from a shared controller to at least one wireless communication device associated with each respective wireless link, communication timing information indicating (a) the interval segmentation data or data derived from the interval segmentation data, and (b) synchronization information for synchronizing the connection interval timing for the plurality of wireless links.

Another aspect of the invention provides method for managing communications via a wireless link between first and second wireless communication devices according to a wireless communications protocol defining a series of connection intervals, each having a defined number of frames for communicating packets. The first wireless communication device accesses interval segmentation data specifying multiple interval segments for each connection interval, each interval segment including a subset of the series of frames, including a first interval segment allocated to transmissions of packets and at least one additional interval segment allocated to retransmissions of failed packets. The first wireless communication device transmits packets to the second wireless communication device only during the first interval segment, and retransmits failed packets to the second wireless communication device only during the at least one additional interval segment.

In some embodiments, accessing the interval segmentation data by the first wireless communication devices comprises receiving the interval segmentation data by the first wireless communication device from a shared controller.

In some embodiments, the first wireless communication device comprises a base station, and the second wireless communication device comprises a wireless headset.

In some embodiments, the wireless communications protocol defining a series of connection intervals comprises a Bluetooth protocol defining a series of eSCO intervals.

In some embodiments, the first interval segment allocated to transmissions of packets includes a larger subset of frames than each of the at least one additional interval segment allocated to retransmissions of failed packets.

In some embodiments, the method further includes: (a) the first wireless communication device determining or accessing frame assignment data specifying a particular frame in each of the multiple interval segments assigned for communications by the first wireless communication device, including a first particular frame in the first interval segment and an additional particular frame in each of the at least one addition interval segments; (b) transmitting packets, from the first wireless communication device to the second wireless communication device, only in the first particular frame in the first interval segment; and (c) retransmitting failed packets, from the first wireless communication device to the second wireless communication device, only during the additional particular frame in each of the at least one additional interval segment.

In some embodiments, the method further includes the first wireless communication device communicating the frame assignment data to the second wireless communication device.

In some embodiments, the first wireless communication device determining or accessing frame assignment data comprises the first wireless communication device randomly selecting a particular frame in each of the multiple interval segments assigned for communications by the first wireless communication device.

In some embodiments, the first wireless communication device determining or accessing frame assignment data comprises the first wireless communication device receiving frame allocation data from a shared controller.

Another aspect of the invention provides a system for managing communications in a wireless environment. The system includes a plurality of wireless links between a plurality of wireless communication devices, each wireless link configured for communication of data packets according to a wireless communications protocol defining a series of connection intervals, each having a defined number of frames for communicating packets. The system also includes non-transitory memory storing interval segmentation data specifying multiple interval segments for each connection interval, each interval segment including a subset of the series of frames, including a first interval segment allocated to transmissions of packets and at least one additional interval segment allocated to retransmissions of failed packets. The plurality of wireless communication devices may use the interval segmentation data to manage timing for packet transmissions and packet retransmissions, such that (a) each wireless communication device performs packet transmissions only during the first interval segment in respective connection intervals, and (b) each wireless communication device performs packet retransmissions only during the at least one additional interval segment in respective connection intervals.

In some embodiments, the plurality of wireless communication devices comprises a plurality of wireless headsets and associated base stations, and each wireless link comprises a wireless link between a respective base station and a respective wireless headset.

In some embodiments, the wireless communications protocol defining a series of connection intervals comprises a Bluetooth protocol defining a series of eSCO intervals.

In some embodiments, the first interval segment allocated to transmissions of packets includes a larger subset of frames than each of the at least one additional interval segment allocated to retransmissions of failed packets.

The segmenting and allocation of frames for packet transmissions and packets retransmissions can reduce packet collisions between multiple wireless links (e.g., between multiple headsets and base stations) in a shared environment, thus lowering the frame error rate of the wireless devices. As a result of reducing the interference between the wireless links in the environment, the maximum user density in the environment may be increased, while achieving defined interference or performance targets.

BRIEF DESCRIPTION OF THE DRAWINGS

The present invention will be readily understood by the following detailed description in conjunction with the accompanying drawings, wherein like reference numerals designate like structural elements.

FIG. 6 illustrates a simplified block diagram of an example base station for use in the system shown in FIG. 5, according to one example embodiment;

FIG. 7 illustrates a simplified block diagram of an example client device (e.g., wireless headset) for use in the system shown in FIG. 5, according to one example embodiment;

FIG. 16 illustrates example density gains achieved by example interval segmentation protocols in transmission protocols that allow a single retransmission, two retransmissions, or three retransmissions, according to an example embodiment.

DETAILED DESCRIPTION

Figure 1:
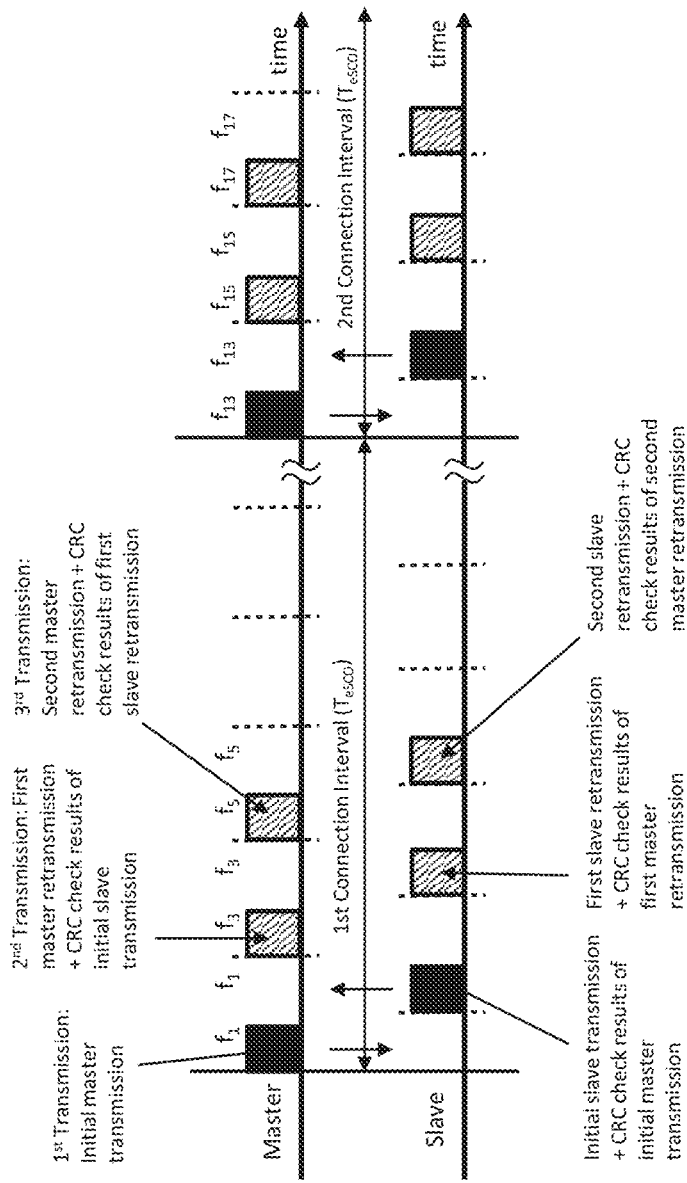
FIG. 1 illustrates a timing diagram of a mono voice link (eSCO) between a wireless headset and base station for a single user, according to a standard Bluetooth protocol implementing fast packet retransmission (ARQ) for failed packets.

Embodiments of the present invention provide systems and methods for managing multiple wireless communication links between wireless devices (e.g., wireless links between wireless headsets and associated base stations) in a wireless communication environment that employs packet retransmissions for failed packet transmissions. The wireless links communicate data packets (e.g., audio data packets) using a defined set of wireless communication resources, e.g., a defined set of time slots (e.g., frames) for communicating packets, a defined set of communication frequencies, or defined set of codes for signal communications (e.g., in a CDMA system). In some embodiments, a shared controller stores or has access to resource segmentation data assigning different segments (subsets) of the available communication resources pool to different stages of attempted packet transmissions: original packet transmissions, first retransmissions of failed packets, second retransmissions of failed packets, etc. For example, the resource segmentation data may define a first segment (subset) of the resource pool to original packet transmissions, a second segment (subset) of the resource pool to first retransmissions of failed packets, a third segment (subset) of the resource pool to second retransmissions of failed packets etc.

The controller manages the wireless communication links between the wireless devices according to the resource segmentation data (e.g., by communicating the resource segmentation data to the wireless devices), such that each wireless device (a) sends original packet transmissions using only the first segment of communication resources, (b) sends first retransmissions of failed packets using only the second segment of communication resources, sends second retransmissions of failed packets using only the third segment of communication resources, etc.

In other embodiments, the resource segmentation data may be programmed or otherwise stored in each wireless device (e.g., during manufacturing or at a later time), as opposed to such data being generated and managed by a shared controller.

By separating (segmenting) and allocating the available communication resource pool between packet transmissions and retransmissions, original packet transmissions are competing for resources only with other original packet transmissions, first retransmissions (of failed original transmissions) are competing for resources only with other first retransmissions, second retransmissions (of failed original first transmissions) are competing for resources only with other second retransmissions, etc. The inventor has discovered that such segmenting and allocation of available wireless communication resources can reduce the interference between transmissions/retransmissions by multiple devices (e.g., headsets and base stations) in a shared environment, thus increasing the effective user density within the environment.

The wireless devices communicate with each other via any suitable short-range wireless communications protocol, including for example Bluetooth, Digital Enhanced Cordless Telecommunications (DECT), or IEEE 802.11 (WiFi). In some embodiments the wireless devices are configured to communicate via a wireless packet-based communications protocol that implements a packet retransmission scheme (for failed packet transmissions), e.g., Bluetooth, Bluetooth Classic, Bluetooth derivatives such as Bluetooth Low Energy (BLE), or Digital European Cordless Telecommunications (DECT) protocols. Depending on the particular embodiment or implementation, such protocol may support one, two, three, or more retransmission attempts for a failed packet transmission.

Wireless links may carry voice data or any other type of packet data suitable for the systems and methods disclosed herein. Voice data may be communicated via any suitable voice communication protocol. In some embodiment, voice data is communicated via a bi-directional synchronous fixed-interval protocol, such as the Bluetooth eSCO protocol, for example.

Figure 3A:
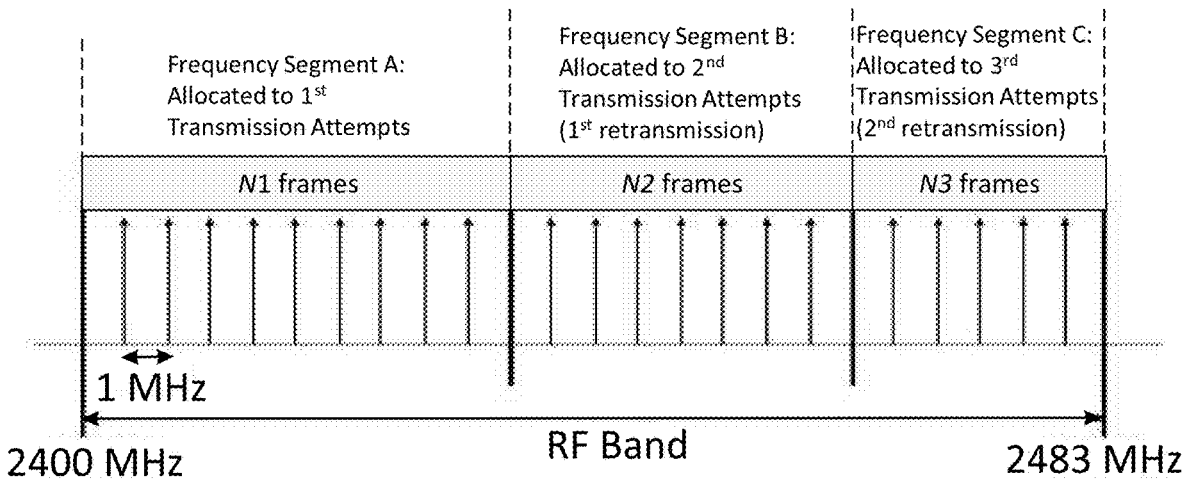
FIG. 3A illustrates an example segmentation of a Bluetooth frequency band into multiple segments (groups of channels within the frequency band) and allocation of the different segments to different transmission attempts (first transmissions, second transmissions, and third transmissions), according to one example embodiment.

FIG. 3A illustrates an example segmentation of communication resources in the frequency domain, according to one example embodiment. In this example implementation, an available Bluetooth frequency band of 2402-2480 MHz includes 79 frequency channels ("carriers") spaced at 1 MHz. Further, in the example implementation the Bluetooth protocol allows up to two retransmissions of failed packets.

In the illustrated example, the frequency band is segmented (e.g., by a shared controller) into three segments: (1) Frequency Segment A including 42 frequency channels (of the 79 available channels), allocated to first packet transmissions, (2) Frequency Segment B including 24 frequency channels, allocated to second transmissions (i.e., first retransmissions of failed packets), and (3) Frequency Segment C including 13 frequency channels, allocated to third transmissions (i.e., second retransmissions of failed packets).

The shared controller may broadcast this frequency segmentation data to wireless devices in the relevant environment, such that all wireless devices may send packet transmissions and retransmissions in the allotted frequency segments. In other embodiments, this frequency segmentation data may be programmed into the wireless devices at manufacturing or other suitable time. Such separation of first, second, and third transmissions may reduce the likelihood of packet collisions, i.e., interference, between the various wireless links in the environment. Within each of the three frequency segments (Frequency Segments A, B, and C), different individual frequency channels may be assigned to different wireless devices, to further reduce interference between the various wireless links.

Figure 3B:
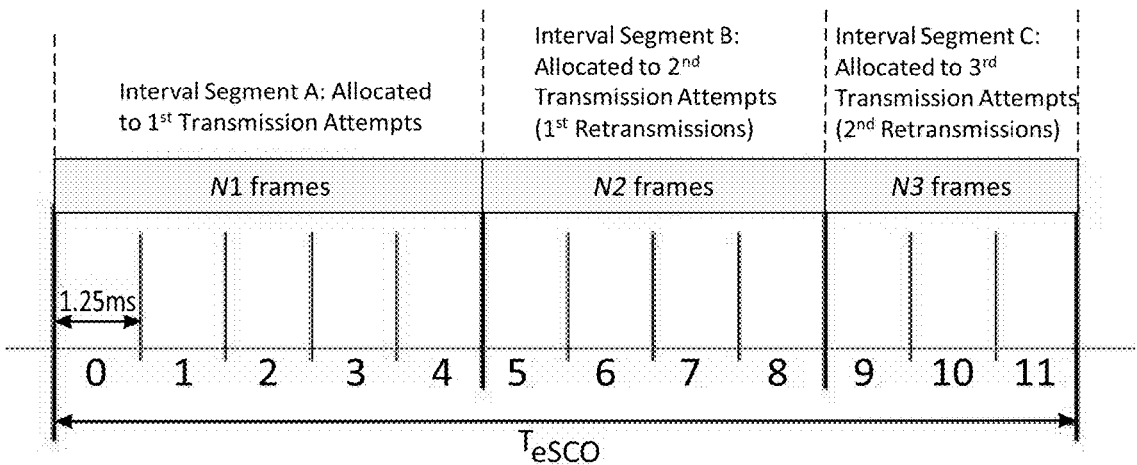
FIG. 3B illustrates an example segmentation of a Bluetooth time interval into multiple interval segments (each including one or more frames) and allocation of the different interval segments to different transmission attempts (first transmissions, second transmissions, and third transmissions), according to one example embodiment.

FIG. 3B illustrates an example segmentation of communication resources in the time domain, according to one example embodiment. In this example implementation, the Bluetooth connection interval (eSCO interval) includes 12 time slots or "frames" for packet transmissions, each frame having a 1.25 ms duration. Typically, a 1.25 ms Bluetooth frame consists of 625 µs time slot for master transmission followed by a 625 µs time slot for slave transmission. Further, in this example implementation the Bluetooth protocol allows up to two retransmissions of failed packets.

In the illustrated example, the connection interval ($T_{eSCO}$) is segmented (e.g., by a shared controller) into three segments: (1) Interval Segment A including 5 frames (of the 12 available frames) allocated to first packet transmissions, (2) Interval Segment B including 4 frames allocated to second transmissions (i.e., first retransmissions of failed packets), and (3) Interval Segment C including 3 frames allocated to third transmissions (i.e., second retransmissions of failed packets).

The shared controller may broadcast this interval segmentation data to wireless devices in the relevant environment, such that all wireless devices may send packet transmissions and retransmissions in the allotted interval segments. In other embodiments, this interval segmentation data may be programmed into the wireless devices at manufacturing or other suitable time. Such separation of first, second, and third transmissions may reduce the likelihood of packet collisions, i.e., interference, between the various wireless links in the environment. Within each of the three interval segments (Interval Segments A, B, and C), different individual frames may be assigned to different wireless devices, to further reduce interference between the various wireless links, as discussed in greater detail below.

Figure 4:
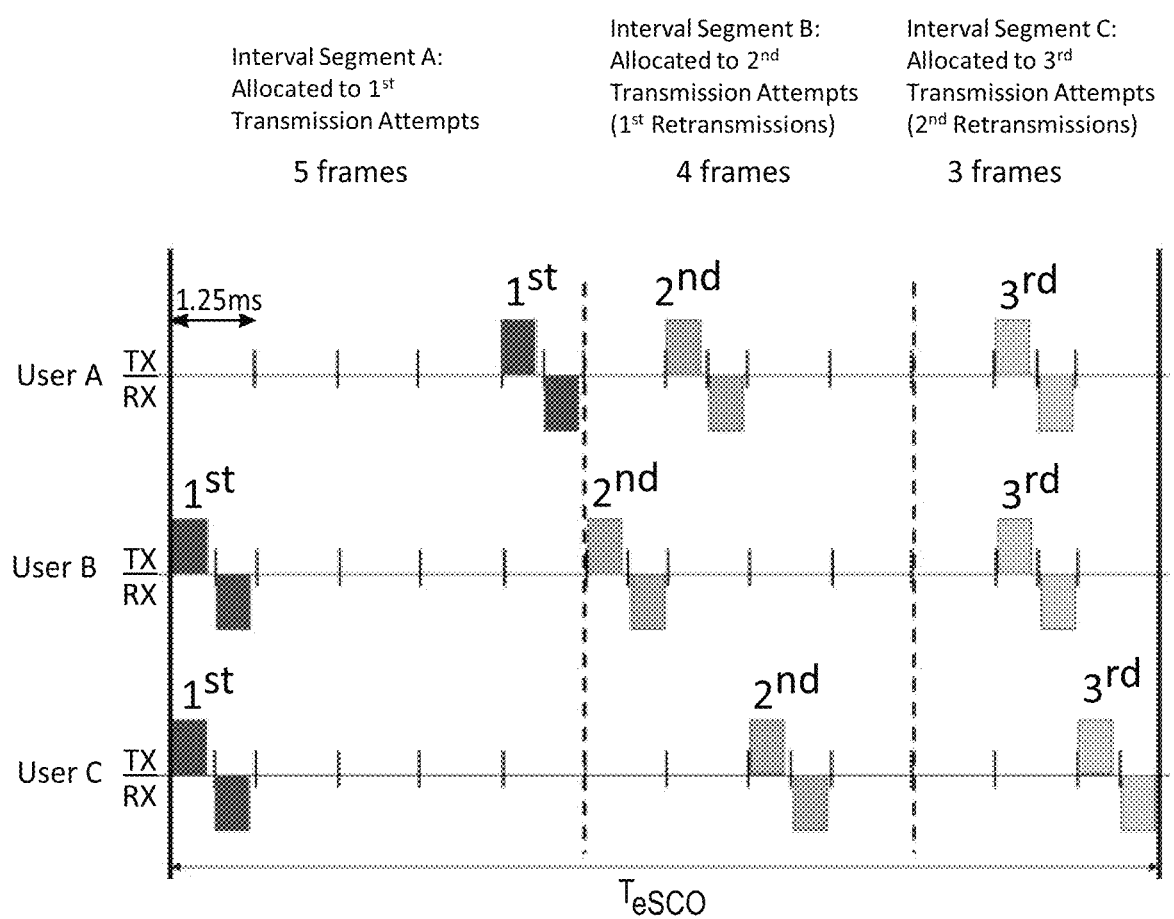
FIG. 4 illustrates an example Bluetooth timing diagram showing packets transmissions and retransmissions (for failed transmissions) by three users according to an interval segmentation protocol defining three interval segments (each including a group of frames) allocated to first packet transmissions, second transmissions, and third transmissions, according to one example embodiment.

FIG. 4 shows an example timing diagram of a mono voice link (eSCO) according to an example Bluetooth protocol shown in FIG. 3B, for three users A, B, and C in physical proximity to each other, e.g., three headset users in a call center, according to one embodiment of the present invention. The voice link for each user A, B, and C comprises a Bluetooth link between a base station (TX) and headset (RX). As discussed above, for each mono voice link, a voice packet is first sent from master (base station) to slave (headset), followed by a voice packet sent from slave (headset) to master (base station). Both packets are sent on the same carrier frequency fx. After the first transmission (indicated by dark shaded boxes), there are two retransmit opportunities (indicated by lightly shaded boxes), which may be sent on different carrier frequencies, e.g., according to a pseudo-random frequency-hopping scheme. This pattern may be repeated during each connection interval TeSCO, each time on different carrier frequencies. Each packet received by each respective device is checked for errors using a CRC code, and retransmission(s) are requested until the packet is successfully received or the maximum number of retransmissions (in this example, two) has been reached.

Figure 2:
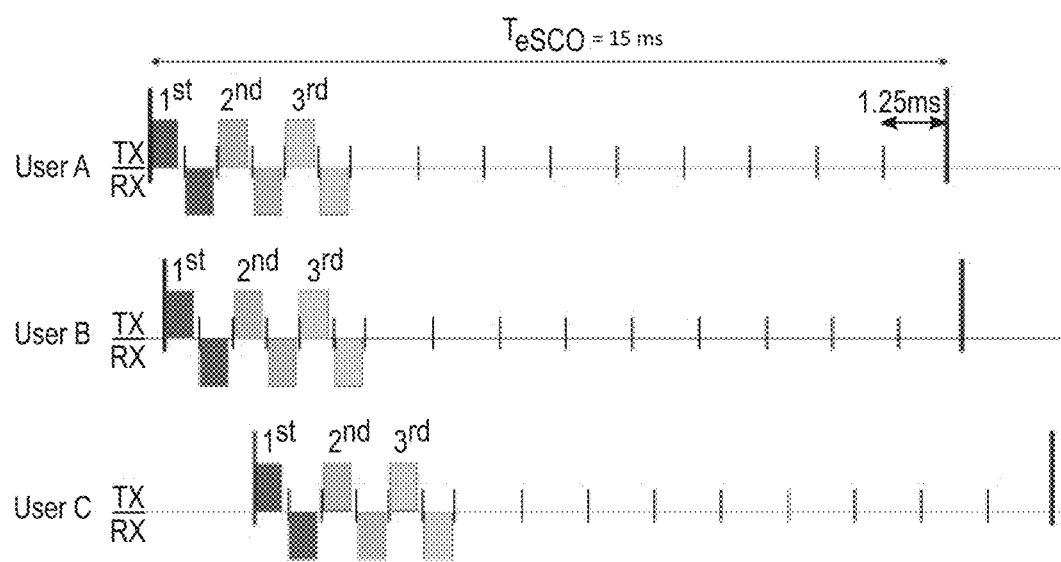
FIG. 2 illustrates an example timing diagram of Bluetooth mono voice links (eSCO) for three users A, B, and C in physical proximity to each other.

Unlike in the conventional scenario shown in FIG. 2 and discussed above, in the example implementation shown in FIG. 4, according to the present invention, the connection intervals of all three wireless links (for users A, B, and C) are synchronized in time, and each connection interval is segmented into three segments, according to the interval segmentation shown in FIG. 3B, namely: (1) Interval Segment A including 5 frames allocated to first packet transmissions, (2) Interval Segment B including 4 frames allocated to second transmissions (i.e., first retransmissions of failed packets), and (3) Interval Segment C including 3 frames allocated to third transmissions (i.e., second retransmissions of failed packets). In addition, each of the three wireless links may have a different frame assignment; for each wireless link, one frame in each interval segment is assigned (e.g., randomly or according to any suitable rules or algorithm) for packet transmission (or retransmission). This interval segmentation and frame assignment protocol may reduce packet collisions between the three users, e.g., as compared with a conventional scheme as shown in FIG. 2.

In addition, in some embodiments the frame assignments for each wireless link may change from interval to interval. For example, with reference to Interval Segment A, the frame assigned for transmissions by User A may hop between frames 1-5 according to any suitable random or non-random protocol. In such embodiment, the protocol would include both frequency hopping (inherent in the Bluetooth protocol) and time hopping (between the different frames within an Interval Segment). As with frequency hopping, such time hopping may be synchronized in the wireless devices (e.g., base stations and headsets) using the piconet clock controlling the link (i.e., as opposed to using a clock from a shared controller).

Figure 5:
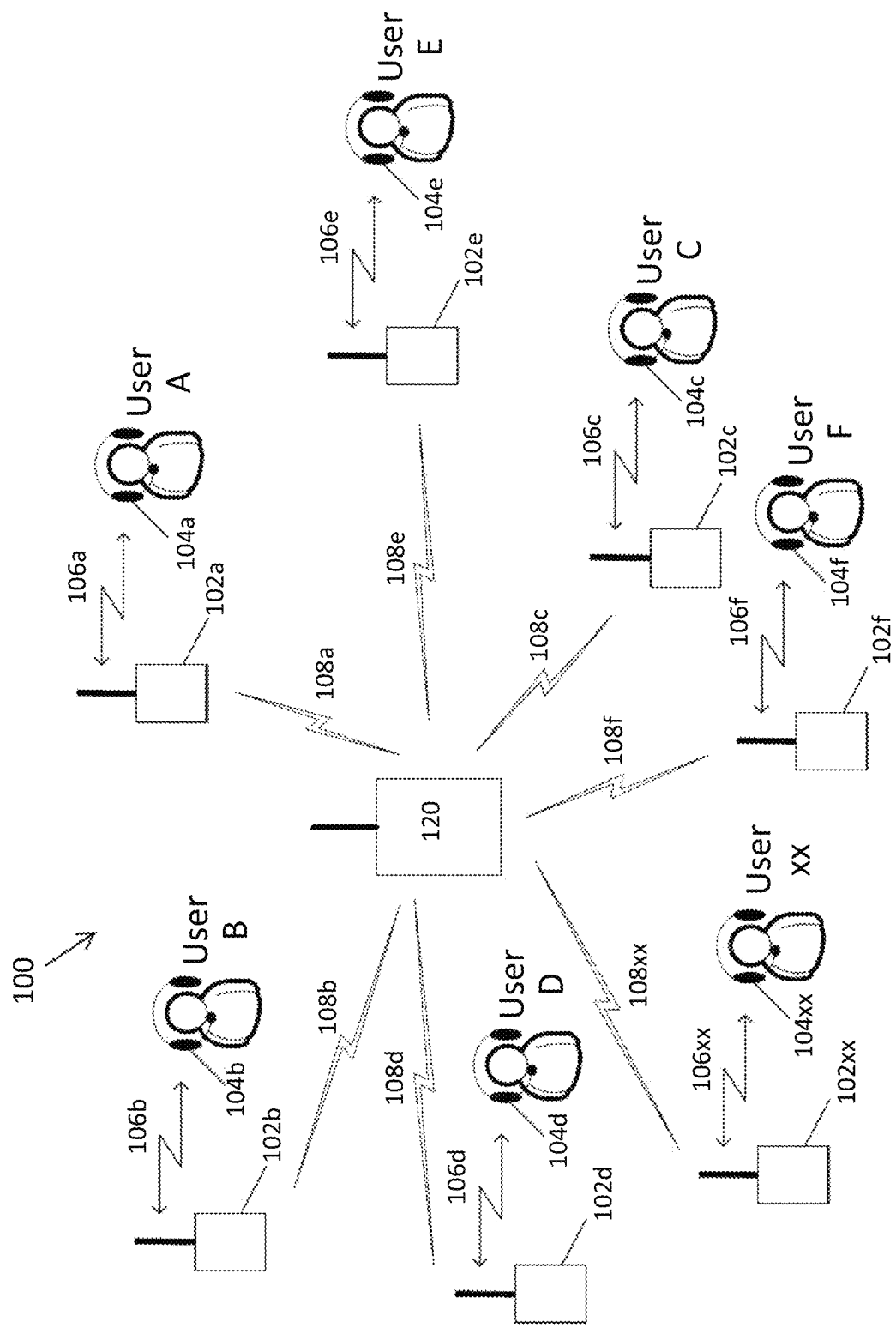
FIG. 5 illustrates a wireless communication system including multiple client devices (e.g., wireless headsets) and base stations connected to a shared controller, wherein packet transmissions are separated in time from packets retransmissions according to a timeslot (frame) allocation protocol, according to one example embodiment of the invention.

FIG. 5 illustrates a wireless radio communication system 100 including multiple wireless devices 102 and 104 configured to communicate via wireless links 106 according to a wireless packet-based communications protocol that implements a packet retransmission scheme (for failed packet transmissions), e.g., a Bluetooth protocol, according to one example embodiment of the invention. The wireless devices 102 and 104 may be configured to communicate according to a segmented transmission protocol in which packet transmissions by devices 102, 104 (e.g., carrying voice data) are separated according to transmission stage, e.g., original transmission, first retransmission, second retransmission, etc., to reduce packet collisions/transmission errors, according to one example embodiment of the invention. In the example embodiment shown in FIG. 5, wireless devices 102, 104 comprise multiple base stations 102a-102xx, each configured to communicate with an associated wireless headset 104a-104xx by a respective wireless link 106a-106xx. However, it should be understood that each wireless device 102, 104 may comprise any type of device configured for wireless communications, e.g., a mobile phone (e.g., smart phone), PDA, laptop or other portable computer, desktop computer or terminal, or other electronic device.

In some embodiments, wireless links 106 may be short-range wireless links and may, for example, be Bluetooth communications links, Digital Enhanced Cordless Telecommunications (DECT) links, or IEEE 802.11 (WiFi) links.

In the embodiment shown in FIG. 5, system 100 includes a shared controller 120 configured to manage wireless links between base stations 102 and headsets 104, for example by (a) synchronizing the connection intervals of wireless links 106 between base stations 102 and headsets 104 and (b) separating and managing the resource pool (e.g., timeslots (frame) and/or frequencies) used by base stations 102 and headsets 104 for first transmissions, second transmissions (e.g., first retransmissions), third transmissions (e.g., second retransmissions), etc. The radio communication system 100 may, for example, be implemented in a telephone call center or other environment having a high density of users. As noted above, separating (segmenting) and allocating of available resource pool as described above can significantly increase the user density within the environment of system 100.

In other embodiments, the base stations 102 and/or headsets 104 may manage the wireless links themselves, without the use of a shared controller. For example, in some embodiments, all base stations 102 and/or headsets 104 are programmed with a set of parameters for managing wireless links between such devices. The set of parameters may include, for example, fixed resource segmentation data defining a fixed segmentation of communication resources (e.g., time resources, frequency resources, or CDMA codes, or some combination of two or more resource types) allocated to first packet transmissions, second packet transmissions, etc. However, embodiments in which the segmented communication resources include time resources (e.g., time slots or frames) may utilize a shared controller or other shared reference device for providing timing synchronization, e.g., by broadcasting clock or timing signals that are received and used by all wireless devices in the are to align their timing.

As discussed above, e.g., with reference to FIGS. 3A and 3B, the available communication resource pool can be segmented and allocated in the frequency domain or in the time domain. The example embodiments of system 100 discussed below are focused on segmenting and allocating resources in the time domain, e.g., wherein the Bluetooth connection interval (eSCO interval) is segmented such that different subsets of frames in the eSCO interval are separately allocated to first transmissions, second transmissions, third transmissions, etc. In other embodiments, system 100 may be configured to segment and allocating frequency resources using similar components and techniques.

In some embodiments, each base station 102 and associated headset 104 are configured to control the timing of packet transmissions (e.g., voice packet transmissions) according to both (a) an interval segmentation protocol that separates the Bluetooth eSCO interval into multiple interval segments (each including one or more frames) and allocates the different interval segments to original packet transmissions, first packet retransmissions, second packet retransmissions, etc., and (b) a frame assignment protocol specifying a particular frame within each defined interval segment for transmitting packets.

Shared controller 120 broadcasts a timing signal to which each base stations 102 (and possibly each headset 104) can time align their timing on link 106xx. In some embodiments, the shared controller 120 may generate or access both the interval segmentation protocol and frame assignment protocol, and communicate both to base stations 102. In other embodiments, the shared controller 120 may communicate the interval segmentation protocol to base stations 102, and each base station 102 may determine a frame assignment protocol (e.g., using frame assignment rules or algorithm) to determine frame assignments for that respective base station 102, defining a specific frame in each defined interval segment for data transmissions by the respective base station 102. Frame assignments for each respective base station 102 may (a) remain fixed throughout a communication connection (e.g., voice call), or (b) change from interval to interval (eSCO interval to eSCO interval).

FIG. 6 illustrates a simplified block diagram of an example base station 102 for use in system 100 shown in FIG. 5, according to one example embodiment. Base station 102 may be configured for wireless communications with an associated wireless headset 104 via a wireless link 106. In some embodiments, base station 102 may be configured to implement a Bluetooth communication protocol including a packet retransmission scheme (e.g., as shown in FIG. 1 discussed above), and further configured to implement (a) an interval segmentation protocol allocating defined interval segments of the Bluetooth eSCO interval (wherein each interval segment includes one or more frame) to original packet transmissions, first packet retransmissions, second packet retransmissions, etc., and (b) a frame assignment protocol specifying a particular frame within each defined interval segment (each interval segment including one or more frame) for transmitting packets.

As shown in FIG. 6, base station 102 may include (among other components) a Bluetooth module 400, a user interface 430, and a power source 440. Bluetooth module 410 may include a processor 402, a Bluetooth radio 404, and a Bluetooth baseband 406. Bluetooth module 400 may also include memory 410 storing interval segmentation data 412, frame assignment data 414, frame assignment rules 416 (in some embodiments), and a Codec library 420.

Interval segmentation data 412 may specify the segmentation of the Bluetooth connection interval for first transmissions, second transmissions, etc. The number of interval segments may depend on the number of packet retransmissions supported by the particular implementation. For example, for an implementation allowing only a single packet retransmission (for a failed packet), interval segmentation data 412 may specify two interval segments—one for transmissions and one for retransmissions—along with the particular frames allocated to each of the two interval segments (e.g., a first interval segment including the first 8 frames allocated to transmissions, and a second interval segment including the last 4 frames allocated to retransmissions). As another example, for an implementation allowing two retransmissions, interval segmentation data 412 may specify three interval segments—a first interval segment for transmissions, a second interval segment for first retransmissions, and a third interval segment for second retransmissions—along with the particular frames allocated to each of the three interval segments (e.g., a first interval segment including the first 6 frames allocated to transmissions, a second interval segment including the next 4 frames allocated to first retransmissions, and a third interval segment including the next 2 frames allocated to second retransmissions).

In some embodiments, interval segmentation data 412 may be received from shared controller 120. In other embodiments, interval segmentation data 412 may be programmed or stored in base station 102 during manufacturing, installation, or other suitable time.

Frame assignment data 414 may specify a specific frame in each defined interval segment (defined by interval segmentation data 412) for transmitting or retransmitting data. As noted above, frame assignment data 414 may remain fixed throughout a communication connection (e.g., voice call), or change from interval to interval (eSCO interval to eSCO interval).

Frame assignment data 414 may be determined and controlled by the shared controller 120 (via signaling from the shared controller 120 to the base station 102), may be determined by the base station 102 itself, e.g., using frame assignment rules 416, or may be pre-programmed at manufacturing or installation. The frame assignment rules 416 may select frames randomly (e.g., as disclosed below in the example embodiment shown in FIG. 9) or may include any suitable rules or algorithm for selecting and assigning frames in respective interval segments for transmitting packets, e.g., to minimize interference with other wireless links 106 in the vicinity. In one embodiment, frame assignment rules 416 may include a frame hopping protocol, e.g., as disclosed below in the example embodiment shown in FIG. 10.

Codec library 420 includes codecs available for selection and use by base station 102. In a Bluetooth implementation, available codecs may include, for example: (a) CVSD (64 kb/s), (b) mSBC (64 kb/s), and (c) mSBC (128 kb/s). New codecs may be included like CELT or LC3. In a Bluetooth implementation, packet types include HV1-HV3, EV3-EVS, 2-EV3, 2-EVS, 3-EV3, and 3-EVS. In an alternative DECT implementation, available codecs may include, for example: (a) G726 (32 kb/s) and (b) G722 (64 kb/s).

Processor 402 executes programs or code stored in memory 410, including frame assignment rules 416 (if present). Bluetooth radio 404 may include an antenna port, and may be implemented on a separate chip. Bluetooth radio 406 may include a Bluetooth compatible transmitter modulator and a Bluetooth compatible receiver modulator. Bluetooth radio 406 is configured to transmit or receive voice or data packets via an antenna. Bluetooth radio 406 may be a dual-mode radio communicating to the client device using the Bluetooth Classic standard and communicating to the central controller using the Bluetooth Low Energy (Long Range) standard.

Processor 402 may include a variety of processors (e.g., digital signal processors), with conventional CPUs being applicable. Memory 410 may include a variety of memories, and in one example includes RAM, ROM, flash memory, or a combination thereof. Memory 410 may further include separate memory structures or a single integrated memory structure.

FIG. 7 illustrates a simplified block diagram of an example wireless headset 104 for use in system 100 shown in FIG. 5, according to one example embodiment. Base station 104 may be configured for wireless communications with an associated base station 102 via a wireless link 106. Like base station 102 discussed above, headset 104 may also be configured to implement a Bluetooth communication protocol including a packet retransmission scheme (e.g., as shown in FIG. 1 discussed above), and further configured to implement (a) an interval segmentation protocol allocating defined interval segments of the Bluetooth eSCO interval (wherein each interval segment includes one or more frame) to original packet transmissions, first packet retransmissions, second packet retransmissions, etc., and (b) a frame assignment protocol specifying a particular frame within each defined interval segment (each interval segment including one or more frame) for transmitting packets.

As shown in FIG. 7, headset 104 may include (among other components) a Bluetooth module 500, a user interface 530, and a power source 540. Bluetooth module 510 may include a processor 502, a Bluetooth radio 504, and a Bluetooth baseband 506. Bluetooth module 500 may also include memory 510 storing interval segmentation data 412, frame assignment data 414 (e.g., communicated from shared controller 120 or base station 102) and/or a Codec library 520.

Interval segmentation data 412 and frame assignment data 414 may be received from shared controller 120, received from a base station 102, or programmed or stored in the headset 104 during manufacturing, installation, or other suitable time, depending on the particular embodiment.

Figure 8:
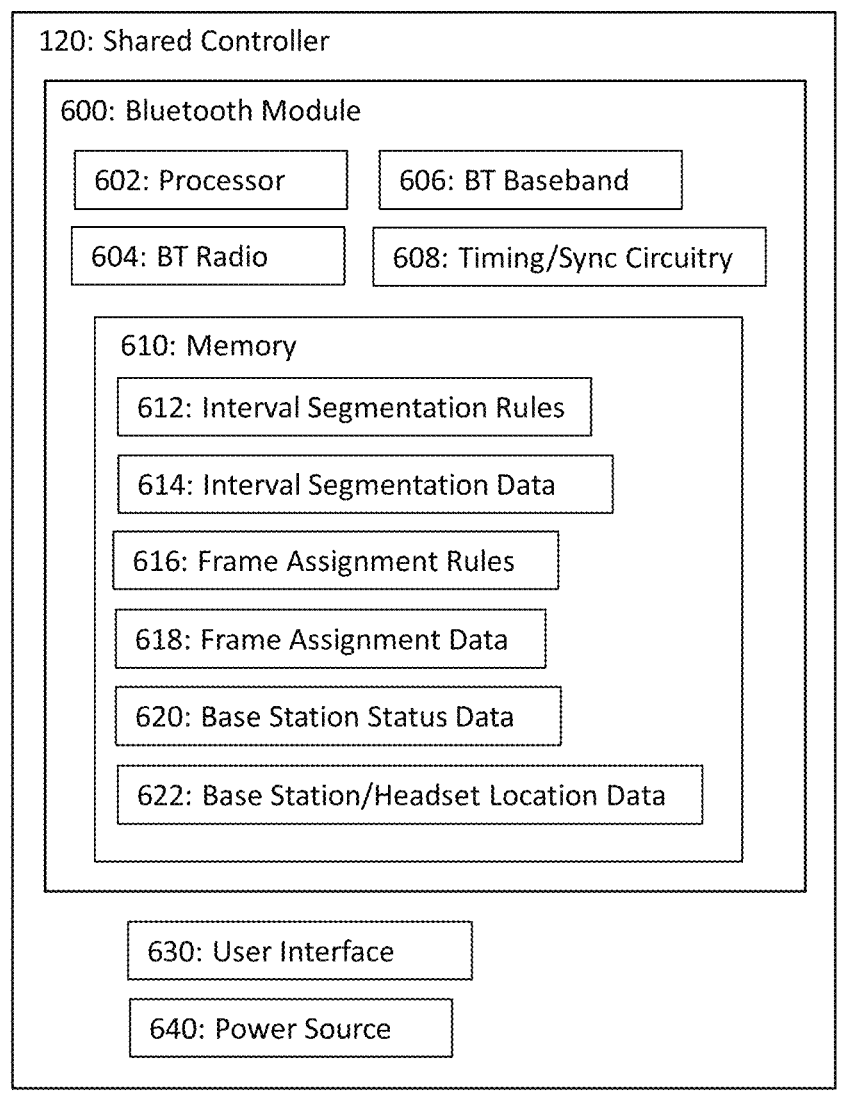
FIG. 8 illustrates a simplified block diagram of an example shared controller for use in the system shown in FIG. 5, according to one example embodiment.

FIG. 8 illustrates a simplified block diagram of an example shared controller 120 for use in system 100 shown in FIG. 5, according to one example embodiment. Shared controller 120 may be configured for wireless communications with base stations 102 and/or wireless headsets 104.

As shown in FIG. 8, shared controller 120 may include (among other components) a Bluetooth module 600, a user interface 630, and a power source 640. Bluetooth module 610 may include a processor 602, a Bluetooth radio 604, a Bluetooth baseband 606, and timing/synchronizing circuitry 608. Bluetooth module 600 may also include memory 610 storing interval segmentation rules 612, interval segmentation data 614, frame assignment rules 616, frame assignment data 618, base station location data 620, and base station status information 622.

Timing/synchronizing circuitry 608 may include any circuitry (hardware, firmware, and/or software) for synchronizing the timing of the Bluetooth connection intervals (eSCO intervals) utilized in the various wireless links 106 in system 100, as one aspect of managing frame assignments of links 106 for reducing packet collisions/cross-link interference. For example, timing/synchronizing circuitry 608 may include any circuitry configured to synchronize the start of each connection interval (eSCO interval) for all wireless links 106, e.g., by periodically broadcasting timing or synchronization beacons.

Each base station 102 and/or headset 104 in system 100 may receive and use the periodically broadcast beacon as a common clock to schedule the transmissions of the respective device. For instance, timing/synchronizing circuitry 608 may include any of the circuitry for implementing any synchronization techniques disclosed in U.S. Pat. No. 6,5574,266, the entire contents of which patent are incorporated herein.

Interval segmentation rules 612 may include any rules or algorithm for segmenting and allocating the Bluetooth connection interval (eSCO interval) to first packet transmissions, second transmissions, etc. Thus, interval segmentation rules 612 may allocate a first subset of frames in each connection interval to first packet transmissions, a second subset of frames in each connection interval to second packet transmissions (first retransmissions of failed packets), a third subset of frames in each connection interval to third packet transmissions (second retransmissions of failed packets), etc., depending on the maximum number of retransmissions defined by the relevant Bluetooth implementation.

Interval segmentation data 614 defines the interval segments generated by interval segmentation rules 612. For example, in an implementation that allows two retransmissions, interval segmentation data 614 may specify frames 1-7 are allocated to original packet transmissions, frames 8-10 are allocated to first retransmissions, and frames 11-12 are allocated to second retransmissions.

In addition to interval segmentation, in some embodiments shared controller 120 is configured to select and assign individual frames in each interval segment for communicating packet data. In such embodiments, shared controller 120 may include frame assignment rules 616 for generating frame assignment data 618 for each respective base station 102. In other embodiments, as discussed above, base stations 102 may generate their own frame assignment data.

Frame assignment rules 616 may include any rules or algorithm for select and assign individual frames in each interval segment for communicating packet data, for each respective base station 102. For example, frame assignment rules 616 may select (a) a first transmission frame selected from the subset of frames in the first interval segment (specified by interval segmentation data 614), for original packet transmissions (b) a second transmission frame selected from the subset of frames in the second interval segment, for second packet transmissions (i.e., first retransmissions) (c) a third transmission frame selected from the subset of frames in the third interval segment, for third packet transmissions (i.e., second retransmissions), etc., depending on the maximum number of retransmissions defined by the relevant Bluetooth implementation.

Frame assignment data 618 specifies the frames selected and assigned for communicating packet data during each respective interval segment, for each respective base station 102 in system 100, or at least for each base station 102 having a currently active session with an associated headset 104. For example, in an implementation that allows two retransmissions, frame assignment data 618 may assign, for a particular base station 102a: (a) frame #5 (selected from frames 1-7 of the first interval segment) for original packet transmissions by the base station 102a and associated headset 104a, (b) frame #8 (selected from frames 8-10 of the second interval segment) for second transmissions/first retransmissions by the base station 102a and associated headset 104a, and (c) frame #12 (from frames 11-12 of the third interval segment) for third transmissions/second retransmissions by the base station 102a and associated headset 104a.

In some embodiments, frame assignment data 618 may be generated by shared controller 120 using frame assignment rules 616, as discussed above. In other embodiments, each respective base station 102 may generate its own frame assignment data 414 using frame assignment rules 416 (as discussed above with respect to FIG. 6) and communicate such data to shared controller 120, which may store such data as frame assignment data 618 and/or use such data for managing interval segmentations and/or frame assignments in system 100.

Shared controller 120 may monitor the status of each base station 102 in system 100, e.g., based on regular signaling with each respective base station 102. For example, controller 120 may monitor whether each base station 102 is connected to a headset 104 and whether each base station 102 has a currently active communication connection with an associated headset 104. Shared controller 120 may store such data as base station status information 620.

Shared controller 120 may also monitor the physical location of each base station 102 and/or headset 104, and store such data as base station/headset location data 622. In some embodiments, controller 120 may use such base station/headset location data 622 as input for geographic distribution of frame assignments, e.g., as discussed below with respect to FIGS. 11A-12.

Figure 9:
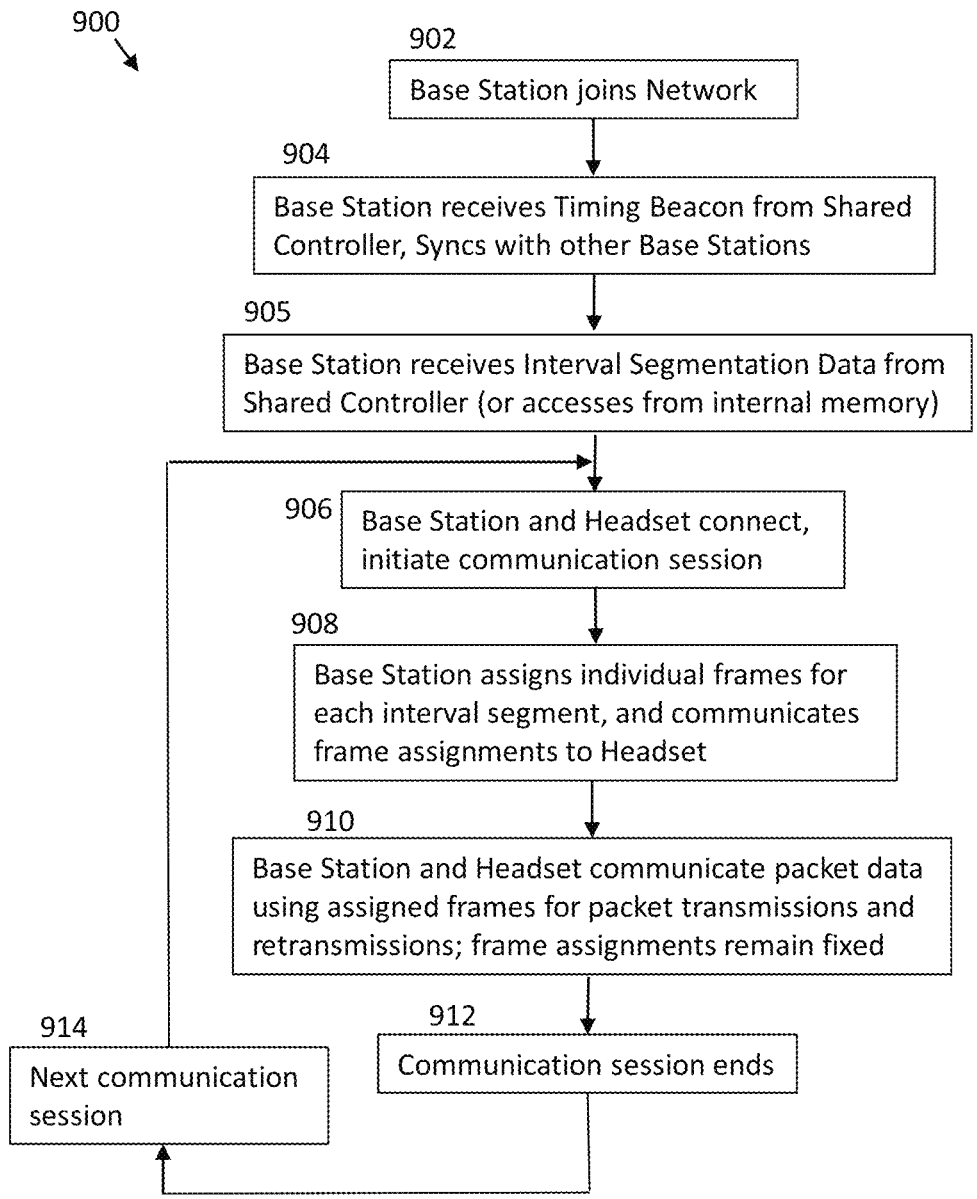
FIG. 9 illustrates a flowchart of an example method for managing communications between a base station and wireless headset according to a first interval segmentation and frame assignment protocol, according to one example embodiment.

FIG. 9 illustrates a flowchart of an example method 900 for managing communications between a base station 102 and wireless headset 104 according to a first example interval segmentation and frame assignment protocol, according to one example embodiment. In the example interval segmentation and frame assignment protocol shown in FIG. 9, the shared controller 120 generates and sends an interval segmentation to a base station, and the base station determines its frame assignments by random selection of frames within each respective interval segment.

At 902, a base station 102 joins a wireless communications network, e.g., the system 100 shown in FIG. 5. For example, base station 102 may be a Bluetooth configured device that joins a Bluetooth network according to a known pairing and/or connection protocol. At 904, the base station 102 may receive a timing signal periodically broadcast by a shared controller, and synchronize an internal clock with the timing signal, such that the base station 102 is synchronized with other communication devices in the network.

At 905, the base station 102 may receive interval segmentation data from the shared controller. The interval segmentation data may specify a segmentation and allocation of the Bluetooth connection interval to different packet transmission attempts (e.g., original transmission attempts, first retransmission attempts, second transmission attempts, etc.). For example, the segmentation data may segment the Bluetooth connection interval (e.g., including 6 or 12 frames) into multiple interval segments, each including a subset of the frames in each connection interval (i.e., a subset of the 6 or 12 frames) allocated to different packet transmission attempts, as disclosed herein. In other embodiments, the interval segmentation data may be pre-programmed in the base station 102, e.g., at manufacturing or installation, as opposed to receiving such data from a shared controller.

At 906, the base station 102 and associated wireless headset 104 may connect and initiate a communication session, e.g., for communicating audio data or other data, using known Bluetooth connection techniques or protocols. At 908, the base station 102 may assign a particular frame in each interval segment for transmission of packets between base station 102 and headset 104, and communicate the frame assignment data to headset 104. Base station 102 may generate such frame assignments in any suitable manner, e.g., randomly or according to defined frame assignment rules.

At 910, base station 102 and headset 104 may communicate packet data with each other in the assigned frame in each respective segment interval, for original packet transmissions, first retransmissions, second retransmissions, etc. In some embodiments, the frame assignments may remain fixed throughout the communication session. At 912, the communication session ends, and the method awaits the next communication session, as indicated at 914.

Figure 10:
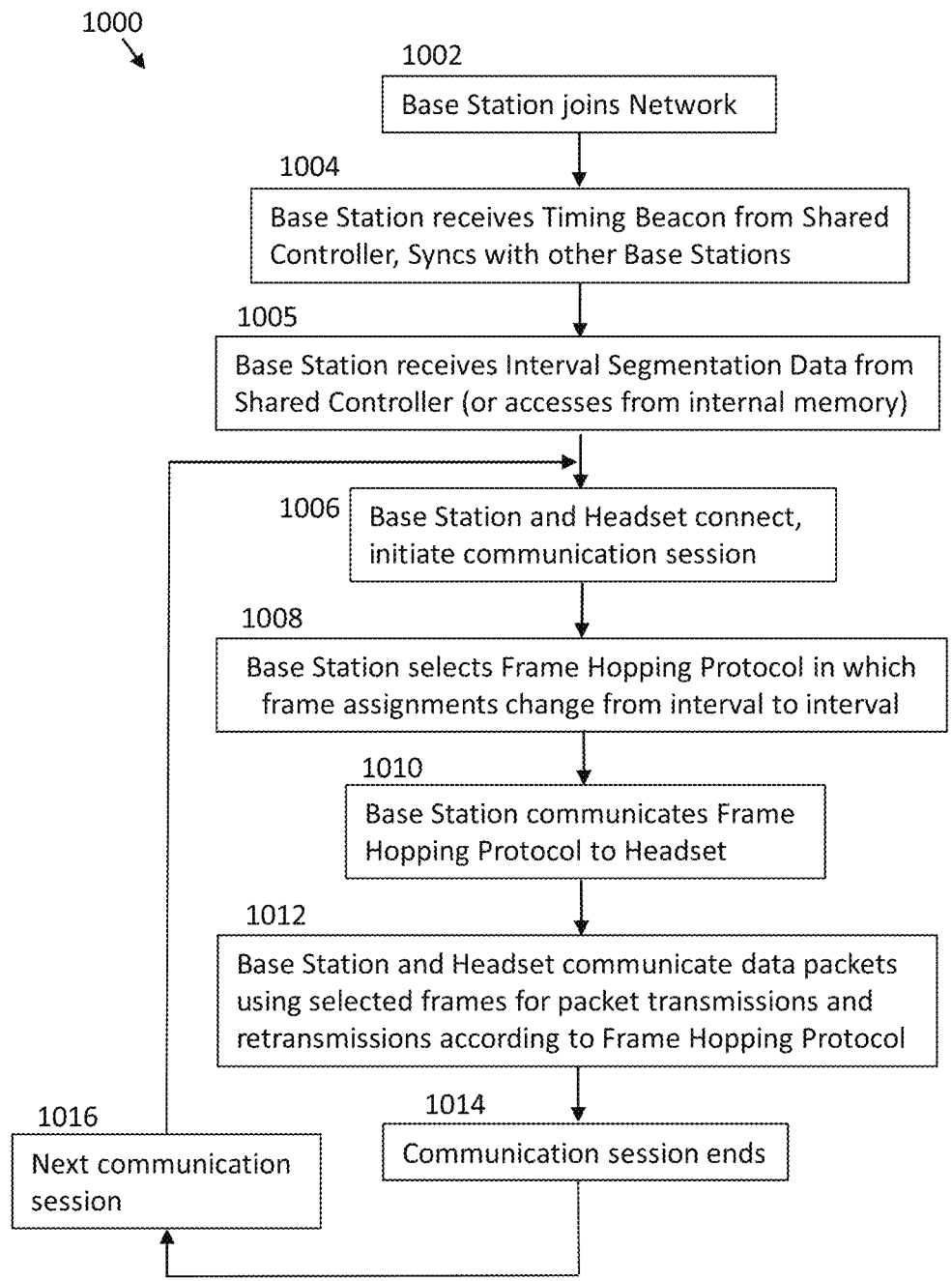
FIG. 10 illustrates a flowchart of an example method for managing communications between a base station and wireless headset according to a second interval segmentation and frame assignment protocol, according to one example embodiment.

FIG. 10 illustrates a flowchart of an example method 1000 for managing communications between a base station 102 and wireless headset 104 according to a second example interval segmentation and frame assignment protocol, according to one example embodiment. In the example interval segmentation and frame assignment protocol shown in FIG. 10, the shared controller 120 generates and sends an interval segmentation to a base station, and the base station determines its frame assignments within each respective interval segment according to a defined frame hopping protocol 416.

At 1002, a base station 102 joins a wireless communications network, e.g., the system 100 shown in FIG. 5. For example, base station 102 may be a Bluetooth configured device that joins a Bluetooth network according to a known pairing and/or connection protocol. At 1004, the base station 102 may receive a timing signal periodically broadcast by a shared controller, and synchronize an internal clock with the timing signal, such that the base station 102 is synchronized with other communication devices in the network.

At 1005, the base station 102 may receive interval segmentation data from the shared controller. The interval segmentation data may specify a segmentation and allocation of the Bluetooth connection interval to different packet transmission attempts (e.g., original transmission attempts, first retransmission attempts, second transmission attempts, etc.). For example, the segmentation data may segment the Bluetooth connection interval (e.g., including 6 or 12 frames) into multiple interval segments, each including a subset of the frames in each connection interval (i.e., a subset of the 6 or 12 frames) allocated to different packet transmission attempts, as disclosed herein. In other embodiments, the interval segmentation data may be pre-programmed in the base station 102, e.g., at manufacturing or installation, as opposed to receiving such data from a shared controller.

At 1006, the base station 102 and associated wireless headset 104 may connect and initiate a communication session, e.g., for communicating audio data or other data, using known Bluetooth connection techniques or protocols.

At 1008, the base station 102 accesses or selects a frame hopping protocol 416 that defines a protocol in which the frames assigned to each segment interval change from connection interval to connection interval (eSCO interval to eSCO interval) according to a defined pattern or defined rules. At 1010, the base station 102 may communicate the frame hopping protocol 416 to the headset 104, such that both devices can determine the assigned frames for each successive connection interval (eSCO interval) at 1010.

At 1012, base station 102 and headset 104 may communicate packet data with each other in the assigned frame in each respective segment interval during each connection interval, according to the frame hopping protocol. At 1014, the communication session ends, and the method awaits the next communication session, as indicated at 1016.

In a Bluetooth implementation (or other implementation that employs a frequency hopping protocol), the frame hopping (time hopping) discussed above runs in parallel with the frequency hopping protocol and may use the same hardware as the frequency hopping protocol. As one example implementation, consider the users (Users A, B, and C) shown in FIG. 4, discussed above. A different carrier frequency may be chosen for each 1.25 ms frame (800 hops/s): f(k) for frame k, f(k+1) for frame k+1, f(k+2) for frame k+2 (note f(k) may be different for a different user, so user A does not (necessarily) have the same f(k) as user B). A frame assignment can be derived based on the carrier frequency used in the first frame of the interval segment.

For example, assume the frame counter is started at k=0 in the first frame in FIG. 4. The first frequency used in Interval Segment A is the frequency in frame 0, namely f(0). Now for Interval Segment A (first transmission, segment size=five frames), we select for the assigned frame: f(0) modulo 5. Thus, if for user A, f_A(0)=71, user A will use frame k=71 mod 5=1 for the first transmission. User B may have f_B(0)=24, and thus use frame number 24 mod 5=4. And so on. For the Interval Segment B (first retransmission), the segment starts at k=5 and has a size of four frames. Now the assigned frame is derived from f(5) modulo 4. For Interval Segment C, the selected frame is derived from f(9) modulo 3. In the next connection interval, f(0), f(5) and f(9) will differ from the previous connection interval (as the Bluetooth frequency hopping pattern is very long, spanning close to 23 hours before repeating), and therefore, in the next connection interval different frames will be assigned for Interval Segments A, B, and C. Because the base station 102 and headset 104 both use the same frequency hopping pattern, they generate the same frames for the frame hopping (time hopping) protocol and no signaling is needed between them. It should be understood this is only one example; the frame hopping (time hopping) protocol may be configured in any other suitable manner.

In some embodiments, the shared controller is configured to account for the physical location of each wireless link (e.g., based on the physical locations of each base station and/or wireless headset) to further optimize the reduction in interference between the various wireless links in a physical environment. For example, the controller may obtain or determine a location of each wireless device (base station and/or headset), relative to fixed point(s) or relative to other wireless devices, which may move over time. Alternatively, the controller may obtain or determine interference information for the various wireless links, as a proxy for physical location. For example, base stations 102 and headsets 104 can perform RSSI (Received Signal Strength Indicator) measurements to determine a measure of interference experienced from nearby users on each frame. The devices 102, 104 can communicate these measurements to the shared controller, which may use such information to generate ordered lists and assign frames to respective devices according to measurements indicating the lowest measured interference. Alternatively, instead of using a shared controller, each base station 102 can use such interference measurements (e.g., RSSI) to select a least-interfered frame for communicating with its respective headset 104.

If there are more active users (e.g., headset users) than the number of frames in a particular segment (e.g., the first interval segment for first packet transmissions), not all users can be assigned an exclusive frame in the first segment. In that case, at least one frame has to be shared by multiple users. However, if the shared controller 120 knows the physical locations of, or distances between, the various users (or RSSI or other interference data, as a proxy for physical location/distance, as discussed above), the controller 120 may use a location-based frame assignments rules or model 616 to assign frames to the various users in an environment such that an average or minimum distance between users sharing any particular frame is maximized or otherwise larger than a randomized or other non-location-based frame assignment. Such location-based frame assignment may increase or optimize signal-to-interference ratio in the environment. That is, even if two users sharing the same transmission frame select the same transmission frequency, the interference may be small enough (due to the attenuation cause by radio propagation over a longer distance) to avoid an error at the receiving device (i.e., the intended signal power level may be much larger than the interference power level).

Figure 11A:
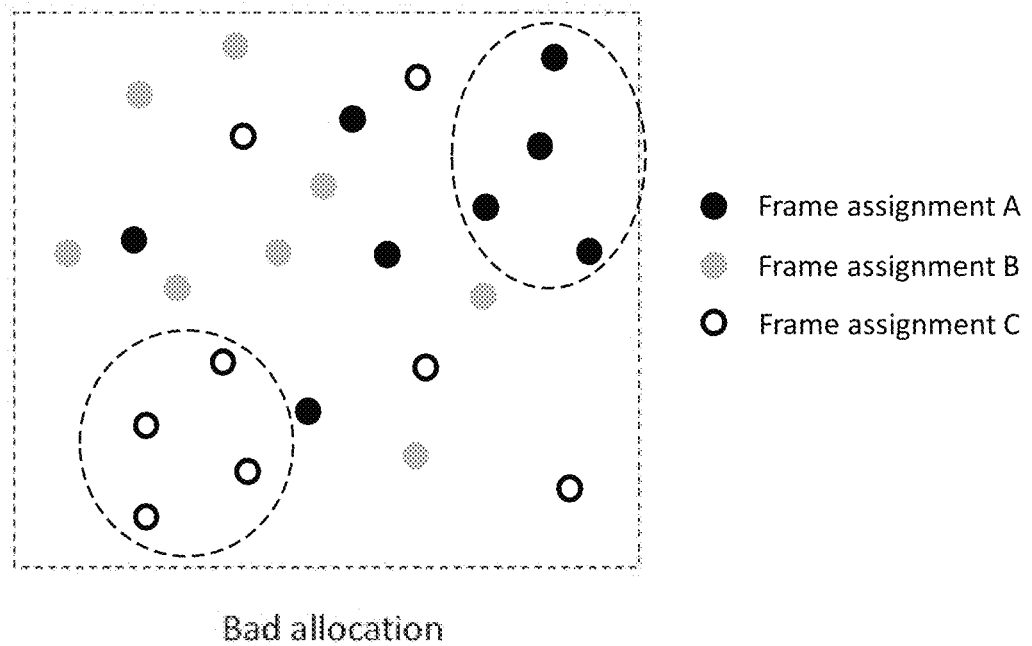
FIG. 11A illustrates an example of a poor distribution of frame assignments among a geographically distributed group of base station/headset pairs.
Figure 11B:
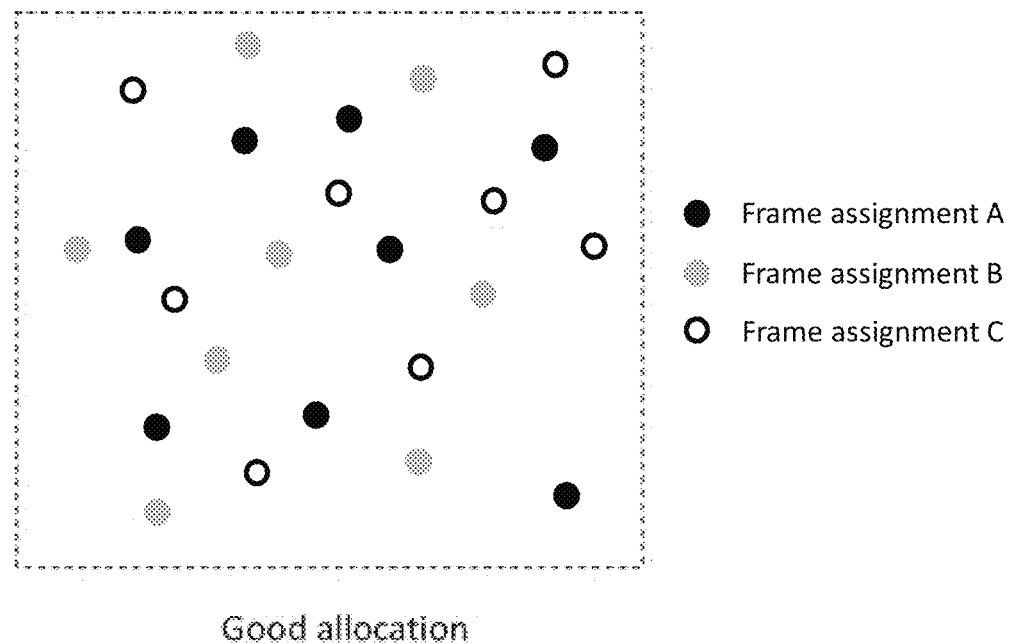
FIG. 11B illustrates an example of a good distribution of frame assignments among a geographically distributed group of base station/headset pairs.

FIGS. 11A and 11B illustrate two example frame assignment scenarios for a group of users in a wireless environment, e.g., a call center, to illustrate the concept of location-based frame assignment. Each scenario assumes three possible frame assignments A, B, or C for each user. FIG. 11A shows an example scenario in which the three possible frame assignments are assigned randomly. As shown, this random assignment may lead to clusters of close-proximity users with the same frame assignments, e.g., a first cluster of users assigned to frame assignment A and a second cluster of users assigned to frame assignment C, indicated by the two dashed ovals. The clustered users are likely to interfere with each other.

In some embodiments, the shared controller is configured to account for the number of users in a certain area to further optimize the reduction in interference between the various wireless links in a physical environment. For example, the controller may obtain information about user density and traffic load per user and dynamically adapt the allocation of segments. When the user density and/or traffic load is low, only one single (large) segment per interval may be allocated allowing first transmissions to share the same resource pool. As user density and/or traffic load increases, more (smaller) segments per interval may be allocated to separate first transmissions from retransmissions, thus reducing the residual error rate. As users disappear or links are released, the shared controller may reduce the number of segments per interval again.

In contrast, FIG. 11B shows an example scenario in which the three possible frame assignments are assigned to users according to a location-based frame assignment model 616 designed to maximize or otherwise increase an average or minimum distance between users sharing any of the three frame assignments A, B, or C. This location-based frame assignment model minimizes or reduces the mutual interference between the various users, e.g., as compared with the random assignment scenario shown in FIG. 11A.

Figure 12:
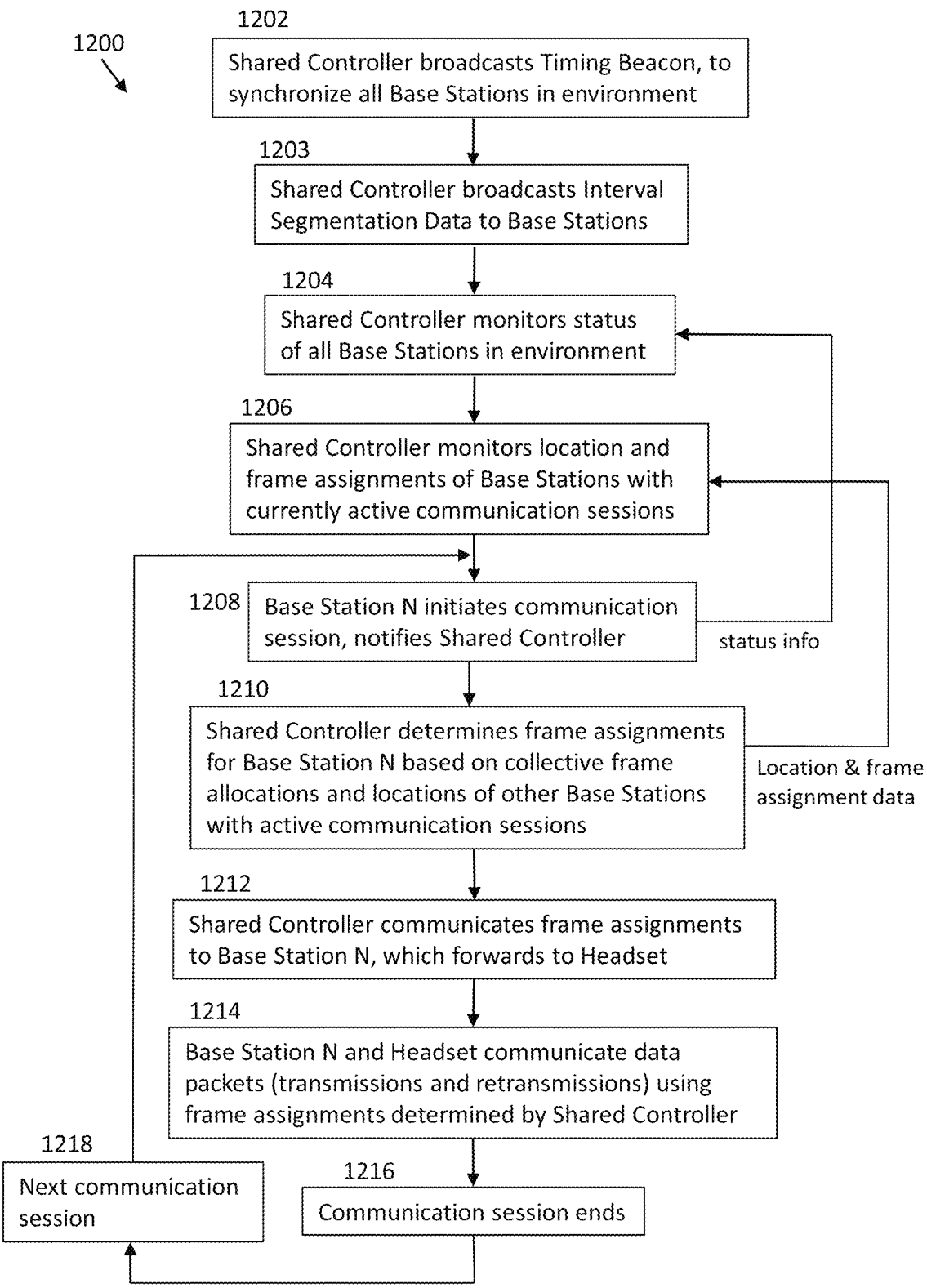
FIG. 12 illustrates a flowchart of an example method for managing communications between a base station and wireless headset according to a third interval segmentation and frame assignment protocol, according to one example embodiment.

FIG. 12 illustrates a flowchart of an example method 1200 for managing communications between a base station 102 and wireless headset 104 according to a third example interval segmentation and frame assignment protocol, according to one example embodiment. In the example interval segmentation and frame assignment protocol shown in FIG. 12, the shared controller 120 generates and sends an interval segmentation to a base station, and also determines frame assignments for each respective base station according to a location-based frame assignment rules or model 616.

At 1202, the shared controller 120 periodically broadcasts a timing signal, which is received and used by all base stations 102 to synchronize all base stations 102 and headsets 104 in the network. At 1203, the shared controller 120 may periodically broadcast interval segmentation data, which may be received and used by all base stations 102 in the network. As discussed above, the interval segmentation data may specify a segmentation and allocation of the Bluetooth connection interval to different packet transmission attempts (e.g., original transmission attempts, first retransmission attempts, second transmission attempts, etc.).

At 1204, the shared controller 120 monitors the status of all base stations 102 in the network. For example, controller 120 may monitor whether each base station 102 has a currently active communication session (with a headset 104). At 1206, the shared controller 120 monitors the physical location (or a proxy thereof) and current frame assignment data for each base station 102 having a currently active communication session. For example, as discussed above, controller 120 may obtain or determine a location of each wireless device (base station 102 and/or headset 104), relative to fixed point(s) or relative to other wireless devices, or may obtain or determine interference information (e.g., RSSI data) for the various wireless links, as a proxy for physical location.

At 1208, a particular base station 102 (base station N) initiates a communication session with a respective headset 104, and notifies the shared controller 120, which may update the monitored status information. At 1210, the shared controller 120 may select frame assignments for base station N based at least on (a) the current frame assignments within the network and (b) the location data of base station N and other base stations 102 in the network. At 1212, the shared controller 120 may communicate the frame assignments selected at 1210 to base station N, which may then forward the frame assignments to the associated headset 104.

At 1214, base station 102 and headset 104 may communicate packet data with each other in the assigned frame in each respective segment interval during each connection interval, according to the frame assignments selected by shared controller 120. At 1216, the communication session ends, and the method awaits the next communication session, as indicated at 1218.

By utilizing the location related data for assigning frames to the various base stations in the network as discussed above, the interference between the various users in a network can be further reduces or minimized. For example, in the example scenario shown in FIG. 4, the shared controller 120 could assign frame 4 to user A and frame 0 to user B (as shown in FIG. 4), and assign frame 2 to user C so it does not overlap in time with user B. However, as there are only 5 frames in Interval Segment A (and even fewer in Interval Segments B and C), only five users can be supported without mutual interference; a sixth user must share the same frame as one of the first five users (although in a typical Bluetooth implementation the users will only interfere if they are on same or nearby carrier frequency). The shared controller 120 can ensure that the frames are evenly distributed over the five available frames in Interval Segment A and that no clustering occurs where many users need to share the same frame.

In addition, in some embodiments, the frame assignment protocol discussed above may be combined with a frame hopping (time hopping) protocol. The shared central controller 120 may determine for each connection interval which users will interfere with each other, and adjust the frame assignments from interval to interval.

Figure 13A:
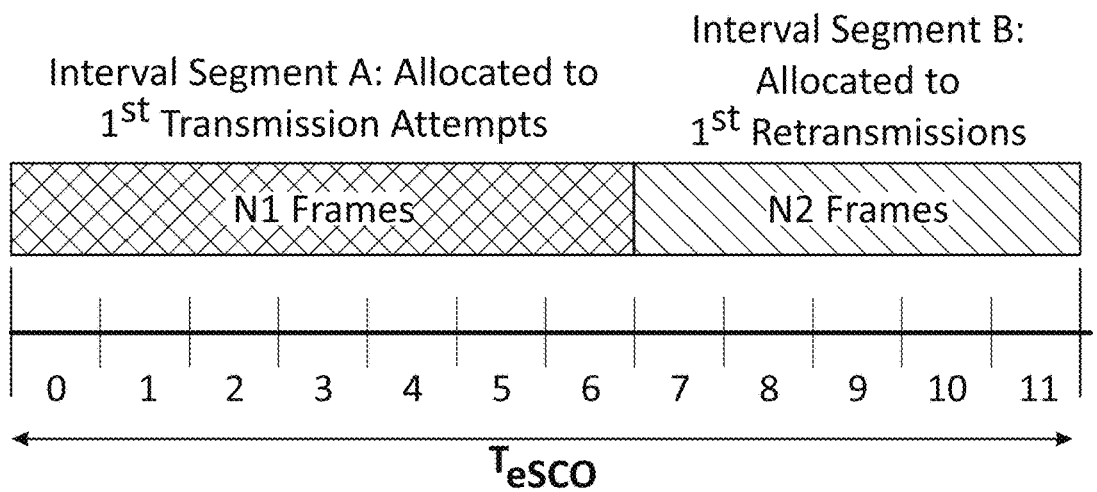
FIG. 13A illustrates an example interval segmentation protocol in which the Bluetooth time interval is segmented into first and second interval segments allocated to first and second packet transmissions, respectively, according to one example embodiment.

FIG. 13A illustrates an example interval segmentation protocol for a Bluetooth implementation that allows only one retransmission, according to one example embodiment. As shown, the Bluetooth time interval ($T_{eSCO}$) is segmented into (a) a first interval segment including N1 frames allocated to first transmissions and (b) a second interval segment including N2 frames allocated to second transmissions (first retransmissions).

Figure 13B:
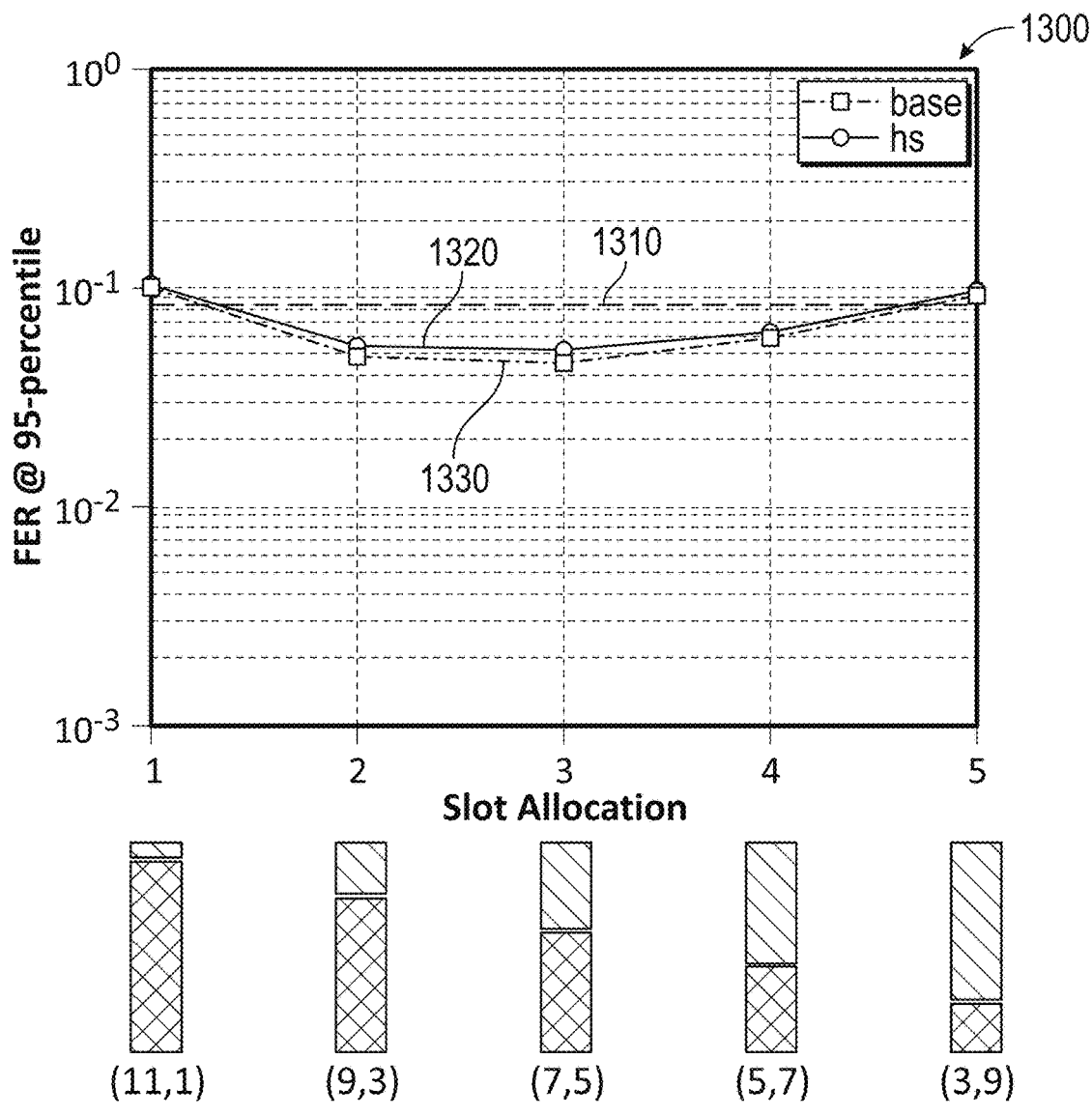
FIG. 13B illustrates example error rate results for different segment size combinations for the first and second interval segments for the protocol shown in FIG. 13A.

FIG. 13B illustrates a plot 1300 of example error rates (FER) for five different segment size combinations for the first and second interval segments for the protocol shown in FIG. 13A. Each of the five different segment size combinations is indicated below the plot 1300 in the form of (N1, N2). Plot 1300 shows the FER data for both base station transmissions/retransmissions (1320) and headset transmissions/retransmissions (1330), relative to a reference line 1310. As shown, segment size combination #2 (N1=9, N2=3) and segment size combination #3 (N1=7, N2=5) provide the best FER results in this example implementation.

Figure 14A:
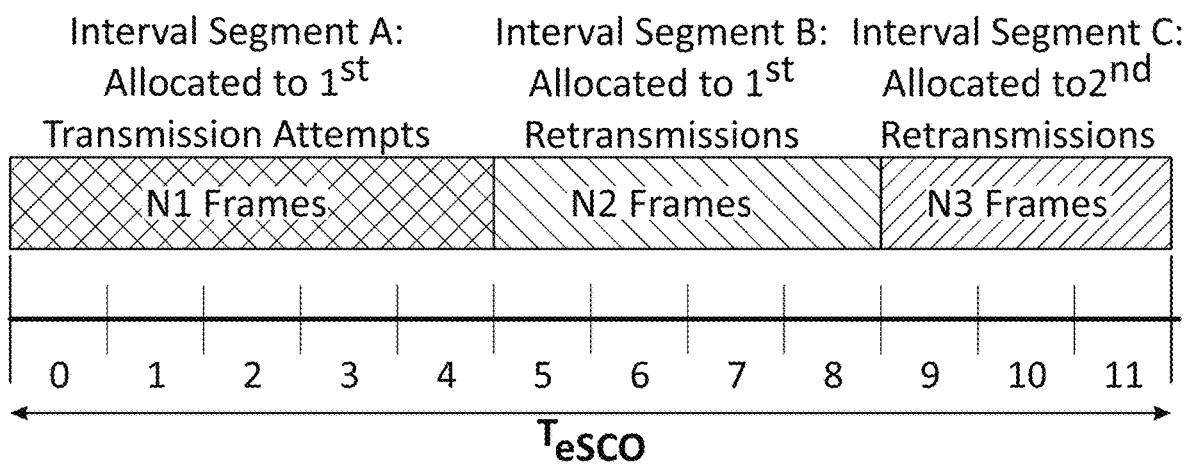
FIG. 14A illustrates an example interval segmentation protocol in which the Bluetooth time interval is segmented into first, second, and third interval segments allocated to first, second, and third packet transmissions, respectively, according to one example embodiment.

FIG. 14A illustrates an example interval segmentation protocol for a Bluetooth implementation that allows two retransmissions, according to one example embodiment. As shown, the Bluetooth time interval ($T_{eSCO}$) is segmented into (a) a first interval segment including N1 frames allocated to first transmissions, (b) a second interval segment including N2 frames allocated to second transmissions (first retransmissions), and (c) a third interval segment including N3 frames allocated to third transmissions (second retransmissions).

Figure 14B:
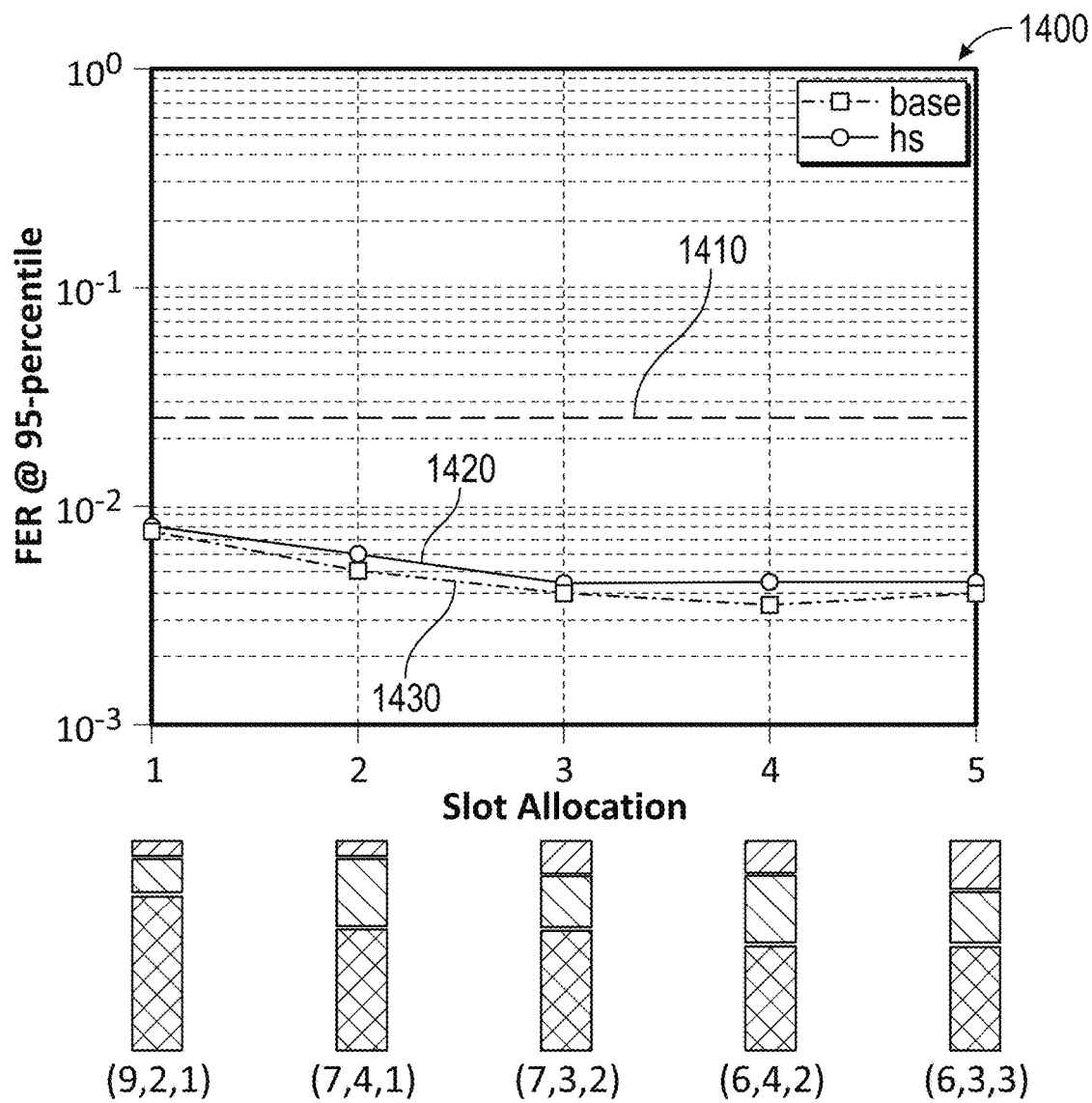
FIG. 14B illustrates example error rate results for different segment size combinations for the first, second, and third interval segments for the protocol shown in FIG. 14A.

FIG. 14B illustrates a plot 1400 of example error rates (FER) for five different segment size combinations for the first, second, and third interval segments for the protocol shown in FIG. 14A. Each of the five different segment size combinations is indicated below the plot 1400 in the form of (N1, N2, N3). Plot 1400 shows the FER data for both base station transmissions/retransmissions (1420) and headset transmissions/retransmissions (1430), relative to a reference line 1410. As shown, segment size combination #4 (N1=6, N2=4, N3=2) provides the best FER results in this example implementation.

Figure 15A:
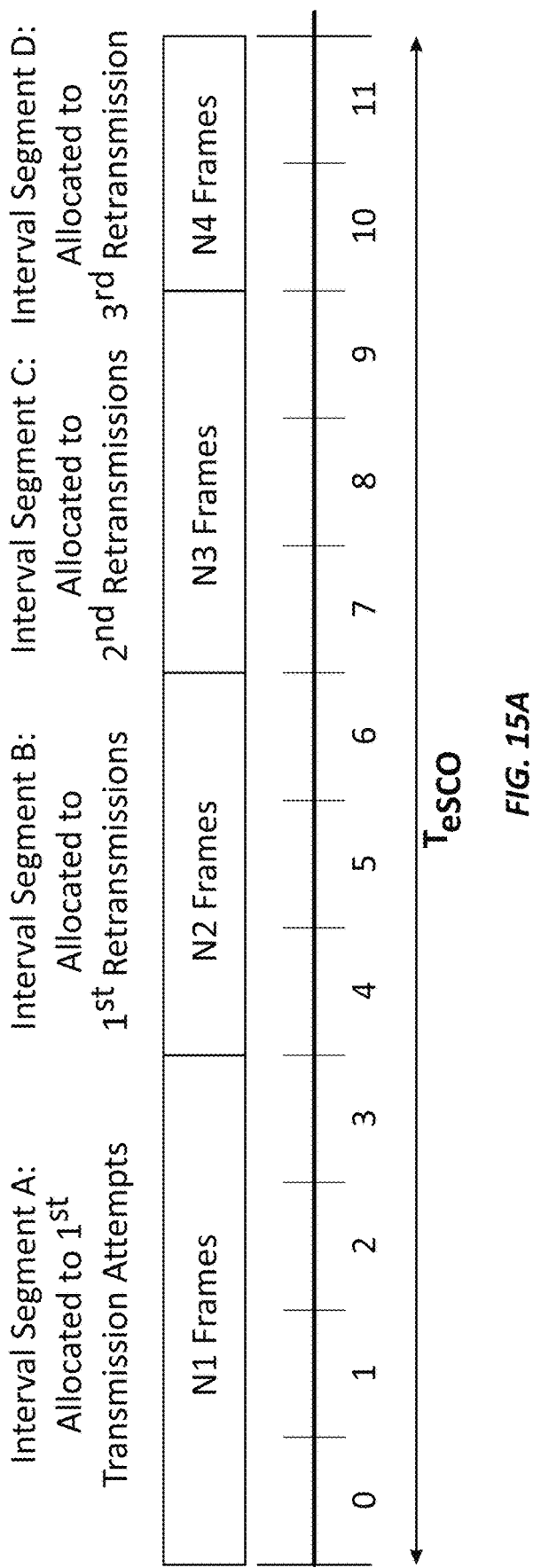
FIG. 15A illustrates an example interval segmentation protocol in which the Bluetooth time interval is segmented into first, second, third, and fourth interval segments allocated to first, second, third, and fourth packet transmissions, respectively, according to one example embodiment.

FIG. 15A illustrates an example interval segmentation protocol for a Bluetooth implementation that allows two retransmissions, according to one example embodiment. As shown, the Bluetooth time interval ($T_{eSCO}$) is segmented into (a) a first interval segment including N1 frames allocated to first transmissions, (b) a second interval segment including N2 frames allocated to second transmissions (first retransmissions), (c) a third interval segment including N3 frames allocated to third transmissions (second retransmissions), and (d) a fourth interval segment including N4 frames allocated to fourth transmissions (third retransmissions).

Figure 15B:
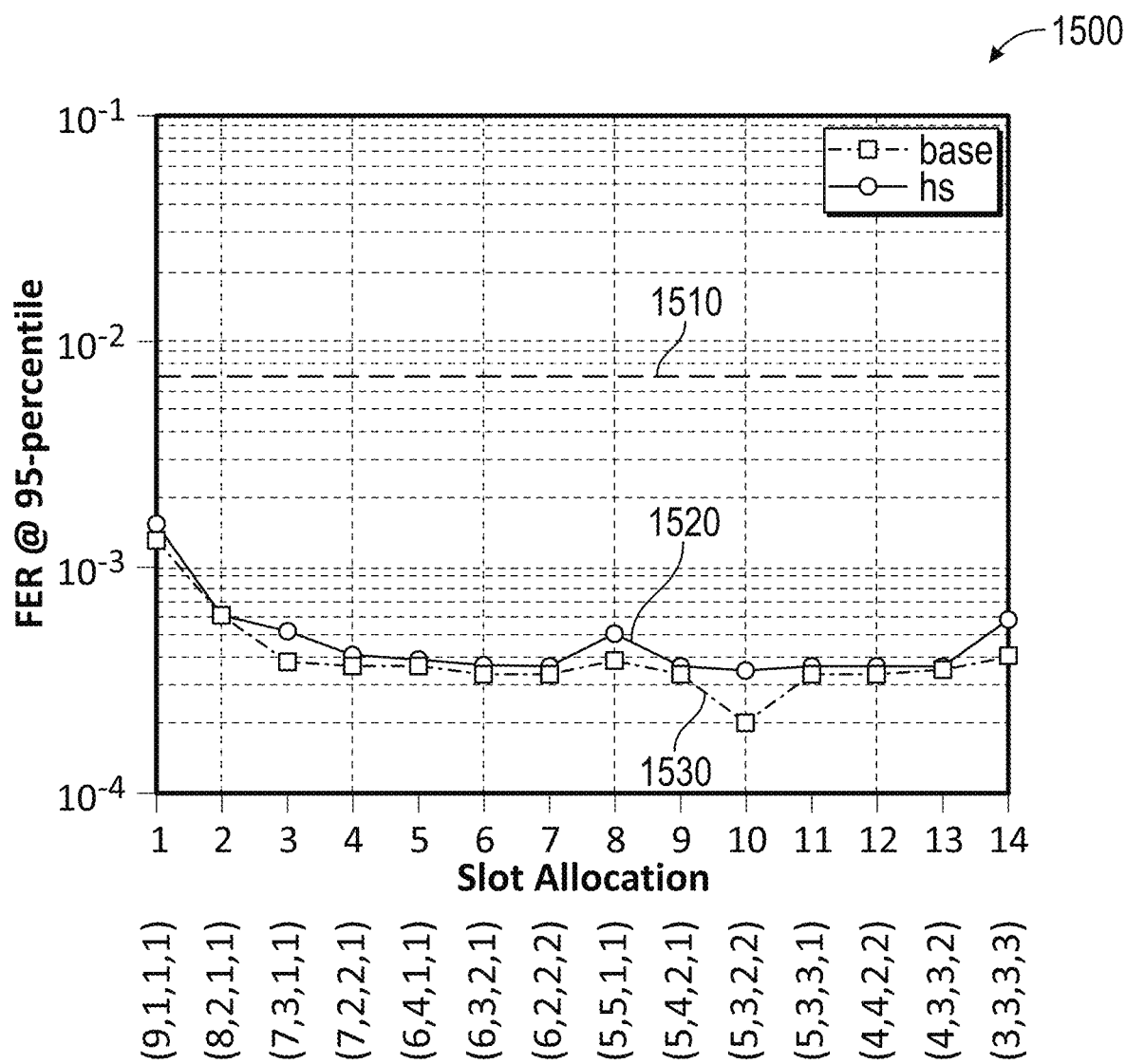
FIG. 15B illustrates example error rate results for different segment size combinations for the first, second, third, and fourth interval segments for the protocol shown in FIG. 15A.

FIG. 15B illustrates a plot 1500 of example error rates (FER) for 14 different segment size combinations for the first, second, third, and fourth interval segments for the protocol shown in FIG. 15A. Each of the 14 different segment size combinations is indicated below the plot 1500 in the form of (N1, N2, N3, N4). Plot 1500 shows the FER data for both base station transmissions/retransmissions (1520) and headset transmissions/retransmissions (1530), relative to a reference line 1510. As shown, segment size combination #10 (N1=5, N2=3, N3=2, N4=2) provides the best FER results in this example implementation.

FIG. 16 illustrates example gains in allowable user density (e.g., to achieve a defined performance level) achieved by example interval segmentations for Bluetooth implementations that allow a single retransmission ($N_{ret}=1$), two retransmissions ($N_{ret}=2$), or three retransmissions ($N_{ret}=3$), according to an example embodiment.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method for managing communications in a wireless environment including a plurality of wireless links communicating data between a plurality of wireless communication devices according to a Bluetooth protocol defining a series of connection intervals, each connection interval including a series of frames for communicating packets, the method comprising:

storing interval segmentation data specifying multiple interval segments for each connection interval, each interval segment including a subset of the series of frames, including a first interval segment allocated to transmissions of packets and at least one additional interval segment allocated to retransmissions of failed packets;

storing for each respective wireless link, in at least one wireless communication device or in a device communicatively coupled with at least one wireless communication device, respective frame assignment data specifying a respective frame in each of the multiple interval segments assigned to each respective wireless link, wherein the multiple interval segments assigned to each respective wireless link includes a respective first frame in the first interval segment and a respective additional frame in each of the at least one addition interval segments assigned to the respective wireless link; and using the interval segmentation data and the frame assignment data to manage a timing of packet transmissions and packet retransmissions by the plurality of wireless communication devices via the plurality of wireless links, such that:

the wireless communication devices associated with each respective wireless link perform packet transmissions only during the first interval segment in respective connection intervals and in the respective first frame assigned to the respective wireless link; and the wireless communication devices associated with each respective wireless link perform packet retransmissions only during the at least one additional interval segment in respective connection intervals and in the at least one respective additional frame assigned to the respective wireless link.

2. The method of claim 1, wherein the packet transmissions and retransmissions comprise transmissions and retransmissions of audio packets.

3. The method of claim 1, wherein the step of using the interval segmentation data to manage a timing of packet transmissions and packet retransmissions by the plurality of wireless communication devices includes communicating, from a shared controller to respective wireless communication devices associated with each respective wireless link, the respective frame assignment data assigned to the respective wireless links.

4. The method of claim 1, comprising determining, by the shared controller, the frame assignment data for the respective wireless link according to frame assignment rules to reduce or minimize interference with other wireless links.

5. The method of claim 1, wherein the frame assignment data for the respective wireless link specifies the respective frame for at least one interval segment changing during the series of connection intervals.

6. The method of claim 1, wherein the series of connection intervals comprises a series of eSCO intervals.

7. The method of claim 1, wherein the first interval segment allocated to transmissions of packets includes a larger subset of frames than each of the at least one additional interval segment allocated to retransmissions of failed packets.

8. The method of claim 1, wherein the interval segmentation data specifies:
the first interval segment allocated to transmissions of packets;
a second interval segment allocated to first retransmissions of failed packets; and
a third interval segment allocated to second retransmissions of failed packets.

9. The method of claim 8, wherein the first interval segment is larger than the second interval segment, and the second interval segment is larger than the third interval segment.

10. The method of claim 1, wherein the interval segmentation data specifies:
the first interval segment allocated to transmissions of packets;
a second interval segment allocated to first retransmissions of failed packets;
a third interval segment allocated to second retransmissions of failed packets; and
a fourth interval segment allocated to third retransmissions of failed packets.

11. The method of claim 10, wherein the first interval segment is larger than the second interval segment, the second interval segment is (a) equal to or larger than the third interval segment, and (b) larger than the fourth interval segment.

12. The method of claim 1, wherein each of the plurality of wireless links communicates data according to a respective connection interval timing; and
the method further comprises using a shared controller to synchronize the connection interval timing for the plurality of wireless links.

13. The method of claim 1, wherein:
each of the plurality of wireless links communicates data according to a respective connection interval timing; and
the step of managing the timing for packet transmissions and packet retransmissions by the plurality of wireless communication devices via the plurality of wireless links comprises communicating, from a shared controller to at least one wireless communication device associated with each respective wireless link, communication timing information indicating:
(a) the interval segmentation data or data derived from the interval segmentation data; and
(b) synchronization information for synchronizing the connection interval timing for the plurality of wireless links.

14. The method of claim 1, comprising storing the respective frame assignment data for each respective wireless link in a shared controller communicatively coupled with respective wireless communication devices.

15. A method for managing communications via a wireless link between first and second wireless communication devices according to a Bluetooth protocol defining a series of connection intervals, each connection interval including a series of frames for communicating packets, the method comprising:

accessing, by the first wireless communication device, interval segmentation data specifying multiple interval segments for each connection interval, each interval segment including a subset of the series of frames, including a first interval segment allocated to transmissions of packets and at least one additional interval segment allocated to retransmissions of failed packets;
determining or accessing, by the first wireless communication device, frame assignment data specifying a respective frame in each of the multiple interval segments assigned to the first wireless communication device, including a respective first frame in the first interval segment and a respective additional frame in each of the at least one addition interval segments;
transmitting packets, from the first wireless communication device to the second wireless communication device, only during the first interval segment and in the first respective frame assigned to the first wireless communication device; and
retransmitting failed packets, from the first wireless communication device to the second wireless communication device, only during the at least one additional interval segment and in the at least one respective additional frame assigned to the first wireless communication device.

16. The method of claim 15, wherein accessing the interval segmentation data by the first wireless communication devices comprises receiving the interval segmentation data by the first wireless communication device from a shared controller.

17. The method of claim 15, wherein:
the first wireless communication device comprises a base station; and
the second wireless communication device comprises a wireless headset.

18. The method of claim 15, wherein the series of connection intervals comprises a series of eSCO intervals.

19. The method of claim 15, wherein the first interval segment allocated to transmissions of packets includes a larger subset of frames than each of the at least one additional subset of frames allocated to retransmissions of failed packets.

20. The method of claim 15, wherein the interval segmentation data specifies:
the first interval segment allocated to transmissions of packets;
a second interval segment allocated to first retransmissions of failed packets; and
a third interval segment allocated to second retransmissions of failed packets.

21. The method of claim 20, wherein the first interval segment is larger than the second interval segment, and the second interval segment is larger than the third interval segment.

22. The method of claim 15, wherein the interval segmentation data specifies:
the first interval segment allocated to transmissions of packets;
a second interval segment allocated to first retransmissions of failed packets;
a third interval segment allocated to second retransmissions of failed packets; and
a fourth interval segment allocated to third retransmissions of failed packets.

23. The method of claim 22, wherein the first interval segment is larger than the second interval segment, the second interval segment is (a) equal to or larger than the third interval segment, and (b) larger than the fourth interval segment.

24. The method of claim 15, further comprising the first wireless communication device communicating the frame assignment data to the second wireless communication device.

25. The method of claim 15, wherein the first wireless communication device determining or accessing frame assignment data comprises the first wireless communication device randomly selecting a respective frame in each of the multiple interval segments assigned for communications by the first wireless communication device.

26. The method of claim 15, wherein the first wireless communication device determining or accessing frame assignment data comprises the first wireless communication device receiving frame allocation data from a shared controller.

27. A method for managing communications in a wireless environment including a plurality of wireless links communicating data between a plurality of wireless communication devices according to a Bluetooth protocol using a defined set of wireless communication resources, the method comprising:
storing, in at least one wireless communication device or in a device communicatively coupled with at least one wireless communication device, frequency segmentation data defining a group of frequencies for wireless communications including (a) a first subset of frequencies allocated to transmissions of packets and (b) at least one additional subset of frequencies allocated to retransmissions of failed packets;
using the frequency segmentation data to manage wireless transmissions and retransmissions of packets by the plurality of wireless communication devices via the plurality of wireless links, such that:
each wireless communication device performs packet transmissions using the first subset of frequencies, but not the at least one additional subset of frequencies; and
each wireless communication device performs packet retransmissions using the at least one additional subset of frequencies but not the first subset of frequencies.

28. The method of claim 27, wherein the first subset of frequencies is larger than each of the at least one additional subset of frequencies.

29. The method of claim 27, further comprising:
for each respective wireless link in the plurality of wireless links:
determining or accessing, by respective wireless communication devices associated with the respective wireless link, frame assignment data for the respective wireless link specifying a respective frame allocated to transmissions of packets and at least one additional respective frame allocated to retransmissions of failed packets; and
transmitting and retransmitting packets, by the respective wireless communication devices, only in the respective frames specified by the frame assignment data for the respective wireless link.

30. The method of claim 27, comprising storing the frequency segmentation data in a shared controller communicatively coupled with respective wireless communication devices.

31. A system for managing communications in a wireless environment, the system comprising:
a plurality of wireless communication devices;
a plurality of wireless links between the plurality of wireless communication devices, each wireless link configured for communication of signals according to a Bluetooth protocol defining a series of connection intervals, each connection interval including a defined number of frames for communicating packets; and
non-transitory memory storing interval segmentation data specifying multiple interval segments for each connection interval, each interval segment including a subset of the series of frames, including a first interval segment allocated to transmissions of packets and at least one additional interval segment allocated to retransmissions of failed packets;
non-transitory memory storing, for each respective wireless link, frame assignment data specifying a respective frame in each of the multiple interval segments assigned to each respective wireless link, the multiple interval segments assigned to each respective wireless link including a respective first frame in the first interval segment and a respective additional frame in each of the at least one addition interval segments assigned to the respective wireless link; and
wherein the plurality of wireless communication devices are configured to use the interval segmentation data and the frame assignment data to manage timing for packet transmissions and packet retransmissions, such that:
wireless communication devices associated with each respective wireless link perform packet transmissions during the first interval segment in respective connection intervals; and
the wireless communication devices associated with each respective wireless link perform packet transmissions during the at least one additional interval segment in respective connection intervals and in the at least one respective additional frame assigned to the respective wireless link.

32. The system of claim 31, wherein:
the plurality of wireless communication devices comprises a plurality of wireless headsets and associated base stations; and
each wireless link comprises a wireless link between a respective base station and a respective wireless headset.

33. The system of claim 31, wherein the series of connection intervals comprises a series of eSCO intervals.

34. The system of claim 31, wherein the first interval segment allocated to transmissions of packets includes a larger subset of frames than each of the at least one additional interval segment allocated to retransmissions of failed packets.

* * * * *